(12) United States Patent
Olander et al.

(10) Patent No.: US 9,383,064 B2
(45) Date of Patent: Jul. 5, 2016

(54) VENTILATION GAS MANAGEMENT SYSTEMS AND PROCESSES

(75) Inventors: W. Karl Olander, Indian Shores, FL (US); Paul J. Marganski, Seymour, CT (US)

(73) Assignee: ENTEGRIS, INC., Billerica, MA (US)

( * ) Notice: Subject to any disclaimer, the term of this patent is extended or adjusted under 35 U.S.C. 154(b) by 1024 days.

(21) Appl. No.: 13/522,000

(22) PCT Filed: Jan. 11, 2011

(86) PCT No.: PCT/US2011/020899
§ 371 (c)(1),
(2), (4) Date: Jul. 31, 2012

(87) PCT Pub. No.: WO2011/088061
PCT Pub. Date: Jul. 21, 2011

(65) Prior Publication Data
US 2012/0315837 A1 Dec. 13, 2012

Related U.S. Application Data

(60) Provisional application No. 61/295,150, filed on Jan. 14, 2010.

(51) Int. Cl.
*B01D 53/02* (2006.01)
*F17C 13/08* (2006.01)
(Continued)

(52) U.S. Cl.
CPC .............. *F17C 13/084* (2013.01); *F17C 11/00* (2013.01); *F17C 11/005* (2013.01); *F17C 11/007* (2013.01); *B01D 53/04* (2013.01); *B01D 2258/0216* (2013.01); *F17C 2201/0109* (2013.01); *F17C 2201/032* (2013.01);
(Continued)

(58) Field of Classification Search
CPC B01D 2258/0216; B01D 53/04; F17C 11/00; F17C 11/005; F17C 11/007; F17C 13/084; F17C 2201/0109; F17C 2201/032; F17C 2201/056; F17C 2205/0111; F17C 2205/0126; F17C 2205/0142; F17C 2205/0176; F17C 2205/018; F17C 2205/0338; F17C 2205/0394; F17C 2250/032; F17C 2250/043; F17C 2250/0439; F17C 2250/0469; F17C 2250/0491; F17C 2250/0636; F17C 2260/044; F17C 2270/0518
See application file for complete search history.

(56) References Cited

U.S. PATENT DOCUMENTS 4,625,627 A 12/1986 Livanos et al.
6,540,819 B2 4/2003 Tom et al.
(Continued)

FOREIGN PATENT DOCUMENTS

CN 1452507 A 10/2003
CN 1942365 A 4/2007
(Continued)

*Primary Examiner* — Christopher P Jones
(74) *Attorney, Agent, or Firm* — Hultquist, PLLC; Steven J. Hultquist; Rosa Yaghmour

(57) ABSTRACT

A ventilation gas management system and process for an enclosure adapted to contain fluid supply vessel(s) and through which ventilation gas is flowed to provide safe operation in the event of leakage of fluid from a vessel. Ventilation gas flow is modulated to accommodate various hazard levels associated with the deployment and operation of such enclosure containing fluid supply vessel(s), e.g., a gas box or gas cabinet in a semiconductor manufacturing facility, thereby achieving reduction in ventilation gas requirements otherwise required for such deployment and operation.

25 Claims, 4 Drawing Sheets

(51) Int. Cl.
*F17C 11/00* (2006.01)
*B01D 53/04* (2006.01)

(52) U.S. Cl.
CPC ..... *F17C2201/056* (2013.01); *F17C 2205/018* (2013.01); *F17C 2205/0111* (2013.01); *F17C 2205/0126* (2013.01); *F17C 2205/0142* (2013.01); *F17C 2205/0176* (2013.01); *F17C 2205/0338* (2013.01); *F17C 2205/0394* (2013.01); *F17C 2250/032* (2013.01); *F17C 2250/043* (2013.01); *F17C 2250/0439* (2013.01); *F17C 2250/0469* (2013.01); *F17C 2250/0491* (2013.01); *F17C 2250/0636* (2013.01); *F17C 2260/044* (2013.01); *F17C 2270/0518* (2013.01)

(56) References Cited

U.S. PATENT DOCUMENTS

| | | | |
|---|---|---|---|
| 7,919,402 B2 | 4/2011 | Jacobson et al. |
| 7,943,204 B2 | 5/2011 | Olander et al. |
| 7,947,582 B2 | 5/2011 | Hautala et al. |
| 8,013,312 B2 | 9/2011 | Adams |
| 8,187,971 B2 | 5/2012 | Russell et al. |
| 8,237,136 B2 | 8/2012 | Hautala et al. |
| 8,252,651 B2 | 8/2012 | Kawasaki |
| 2002/0014407 A1 | 2/2002 | Allen et al. |
| 2003/0023118 A1 | 1/2003 | Kanayama et al. |
| 2003/0226588 A1 | 12/2003 | Olander et al. |
| 2004/0166612 A1 | 8/2004 | Maydan et al. |
| 2004/0235280 A1 | 11/2004 | Keys et al. |
| 2005/0039425 A1 | 2/2005 | Olander et al. |
| 2005/0191816 A1 | 9/2005 | Vanderpool et al. |
| 2006/0097193 A1 | 5/2006 | Horsky et al. |
| 2007/0148888 A1 | 6/2007 | Krull et al. |
| 2008/0305598 A1 | 12/2008 | Horsky et al. |
| 2011/0079241 A1 | 4/2011 | Sinha et al. |

FOREIGN PATENT DOCUMENTS

| | | |
|---|---|---|
| CN | 101093056 A | 12/2007 |
| CN | 101230948 A | 7/2008 |
| JP | 6-74399 A | 3/1994 |
| JP | 2000-306542 A | 11/2000 |
| JP | 2003-207181 A | 7/2003 |
| JP | 2005-529294 A | 9/2005 |
| WO | 0183084 A1 | 11/2001 |
| WO | 03103862 A1 | 12/2003 |
| WO | 2004003973 A2 | 1/2004 |
| WO | 2005025715 A2 | 3/2005 |
| WO | 2005059942 A2 | 6/2005 |
| WO | 2011088061 A2 | 7/2011 |

VENTILATION GAS MANAGEMENT SYSTEMS AND PROCESSES

CROSS-REFERENCE TO RELATED APPLICATIONS

This application is a U.S. national phase under the provisions of 35 U.S.C. §371 of International Patent Application No. PCT/US2011/020899 filed Jan. 11, 2011, which in turn claims the benefit under 35 U.S.C. 119 of U.S. Provisional Patent Application No. 61/295,150 filed Jan. 14, 2010 in the names of W. Karl Olander and Paul J. Marganski for "Ventilation Gas Management Systems and Processes." The disclosures of such International Patent Application No. PCT/US2011/020899 and U.S. Provisional Patent Application No. 61/295,150 are hereby incorporated herein by reference, in their respective entireties, for all purposes.

FIELD OF THE INVENTION

The present invention generally relates to ventilation gas management systems and processes. In various embodiments, the invention relates more specifically to exhaust systems used for venting of gas boxes and gas cabinets containing fluid supply vessels, and to semiconductor manufacturing facilities and processes utilizing same.

DESCRIPTION OF THE RELATED ART

In the use of sorbent-based fluid storage and dispensing vessels, of the type commercialized by ATMI, Inc. (Danbury, Conn., USA) under the trademark "SDS," fluids are stored on a physical sorbent medium in a closed vessel and are desorbed under dispensing conditions to supply the fluid for use. The dispensing conditions may include a pressure differential between the interior volume of the vessel and the dispensing line connected to the valve head of the vessel, input of heat to the adsorbent in the vessel, or flow of the carrier gas through the vessel, or two or more of such dispensing modes, whereby the fluid is desorbed for discharge from the vessel. As a result of the storage of the fluid in the adsorbed state, the fluid pressure in the storage and dispensing vessel can be maintained at very low pressures, e.g., sub-atmospheric pressure.

In consequence of such low-pressure storage, the adsorbent-based vessels have a substantially improved safety character, in relation to conventional high pressure fluid supply cylinders, which may contain the fluid at high super-atmospheric pressures, e.g., pressures on the order of 800 to 2000 psig. Such high pressure cylinders represent a significant hazard in the event of cylinder leakage. Since the fluid in the high pressure cylinder is at significantly higher pressure than the ambient environment of the cylinder, such rupture or leakage event can cause a rapid dispersion of all of the fluid inventory into the ambient environment of the cylinder.

By contrast, when a leakage event occurs in a sorbent-based fluid storage and dispensing vessel, the low storage fluid pressure minimizes such dispersion to the ambient environment. Further, in the case where the storage pressure is sub-atmospheric, there will be a net influx of ambient gas into the vessel. Such net inflow will serve to dilute the vessel contents, and further diminish the threat of hazard in the vicinity of the vessel, thereby avoiding the rapid discharge of toxic or hazardous fluid at higher than threshold limit value levels that is characteristic of leakage events involving high pressure fluid supply cylinders.

In view of their substantially enhanced safety character, sorbent-based fluid storage and dispensing vessels have come into wide usage in applications in which toxic or hazardous fluids must be dispensed to fluid-utilizing processes and equipment, such as the semiconductor manufacturing industry.

In semiconductor manufacturing, such sorbent-based fluid storage and dispensing vessels may be utilized in a wide variety of manufacturing operations, including chemical vapor deposition, etching, ion implantation, atomic layer deposition, cleaning, etc.

In ion implantation, sorbent-based fluid storage and dispensing vessels have been particularly widely employed, in which the dopant gas for the implantation is stored in the vessel at sub-atmospheric pressure and dispensed to the ion source for generation of ionic species that are separated to form an ion beam for the implantation.

In the semiconductor manufacturing industry, internally pressure-regulated fluid supply vessels have also come into widespread usage, as a safer alternative to conventional high pressure gas cylinders. Such internally pressure-regulated fluid supply vessels are commercially available from ATMI, Inc. (Danbury, Conn., USA) under the trademark VAC, and utilize one or more regulator devices in the interior volume of the fluid supply vessel. The regulator devices employed in such fluid supply vessels have pressure set points that are selected to provide a desired dispense pressure of the fluid discharged from the supply vessel, e.g., a sub-atmospheric dispense pressure or a low superatmospheric dispense pressure.

In the aforementioned semiconductor manufacturing operations, it is conventional practice to deploy the fluid supply vessels in enclosures, such as gas cabinets or gas boxes. These containment structures provide a closed interior volume in which the fluid storage and dispensing vessel(s) can be mounted for use. In the enclosure, the dispensing vessels are coupled with flow circuitry for selective discharge of fluid from a specific vessel to the flow lines of such flow circuitry. The flow circuitry in the enclosure is coupled to flow circuitry outside of the enclosure, comprising fluid lines, conduits, manifolds, and the like, by which the fluid is transmitted to a downstream point of use. The flow circuitry in the gas cabinet and the flow circuitry outside the cabinet may be widely varied in character, and may include fluid flow passages containing flow control valves, regulators, mass flow controllers, electronic pressure sensors, pressure transducers, heat tracing members, restrictive flow orifices, excess flow valves, filters, purifiers, overpressure relief devices, manifolds, mixing devices, valve manifold boxes, snubbers, thermocouples, sidestream sampling structures, rotameters, manometers, compositional sensors, and other components that are utilized in specific flow arrangements for conducting fluid from the fluid storage and dispensing vessel in the enclosure to a point of use.

Fluid vessel enclosures such as gas cabinets and gas boxes are typically exhausted with ventilation gas, e.g., air, which is flowed through the enclosure, so that any leakage of fluid from the fluid storage and dispensing vessel is swept away by entrainment in the ventilation gas stream. The resulting ventilation gas effluent containing any leaked fluid component may be conducted to a scrubber or other treatment unit ensuring that any toxic or hazardous components in the ventilation gas are abated to permit venting of the treated ventilation gas to the atmosphere or other disposition or use.

The ventilation gas utilized for ventilation of gas boxes and other enclosures containing fluid supply vessels in semiconductor manufacturing facilities is typically continuously flowed through such enclosures at flow rates of 300-500 ft.$^3$ per minute, based on considerations of containment of a worst case release (WCR) event deriving from leakage of gas from a high pressure gas cylinder.

The gas box is conventionally constructed with permanent openings to allow sweep air to flow into it at a controlled rate as well as access ports or doors that can be selectively opened for system maintenance and/or replacement of fluid dispensing vessels. The flow rate of ventilation gas through a gas box in a semiconductor manufacturing facility typically is a function of the duct diameter of ducts used to withdraw the ventilation gas flow to the gas box and exhaust the gas box, as well as the static pressure that is generated or applied from the house ventilation/exhaust system of the facility. The exhaust duct may be equipped with a damper, or louvers in the doors of the gas box may be provided, which are employed to provide specific air flows through the gas box.

Current gas box ventilation practice is delineated in the International Fire Code, Section 3704.1.2, according to which the average face velocity at the face of gas cabinet access ports or windows cannot be less than 200 feet per minute, with a minimum velocity of 150 feet per minute at any point of the access port or window. Similar standards have been promulgated by the Semiconductor Equipment Manufacturers International (SEMI) organization for ventilation practices.

Such regulations are intended to ensure that when the access door of the enclosure is open, the rate of air intake is sufficient to capture any toxic or hazardous species that could be present or released during that time, e.g., to maintain worker exposure to toxic gases below ¼ of the personal exposure limit (PEL). Compliance with these regulations is particularly important when the fluid dispensed in the gas box is of pyrophoric character, such as silane. In such instances, an amount of ventilation gas is desired to be flowed through the gas box that is sufficient to dilute any leakage of the pyrophoric fluid to a safe concentration, e.g., a concentration of ¼ of its lower explosive limit (LEL) or lower flammability limit (LFL).

The art continues to seek improvements in safety and economy associated with gas utilization in fluid-utilizing facilities such as semiconductor manufacturing facilities, in which fluid storage and dispensing vessels are used to supply fluid to fluid-utilizing units such as vapor deposition chambers and ion implantation equipment.

SUMMARY

The present invention relates to systems and processes for management of ventilation gas in process facilities in which ventilation gas is flowed through an enclosure containing fluid supply vessel(s) and associated flow circuitry to establish safe operation in relation to leakage of fluid from the fluid supply vessel(s) and/or flow circuitry.

In one aspect, the invention relates to a ventilation gas management system for an enclosure containing a fluid supply vessel and flow circuitry coupled thereto and adapted for flow of ventilation gas through the enclosure, such system comprising:

a flow modulator arranged to control ventilation gas flow through the enclosure;

a monitoring assembly adapted to (i) monitor a characteristic of the fluid supply vessel, enclosure, or fluid in or dispensed from the fluid supply vessel, that affects a level of hazard or risk associated with leakage of fluid from said fluid supply vessel or associated flow circuitry in said enclosure, and (ii) output a monitoring signal correlative of the monitored characteristic; and a controller arranged to receive said monitoring signal from the monitoring assembly, and to responsively adjust the flow modulator in relation to the level of hazard or risk associated with leakage of fluid from the fluid supply vessel in the enclosure.

In another aspect, the invention relates to a method of supplying gas from a fluid source in an enclosure through which ventilation gas is flowed, such method comprising monitoring a characteristic of the fluid source, enclosure, or fluid in or dispensed from the fluid source, that affects a level of hazard or risk associated with leakage of fluid from the fluid source or associated flow circuitry in said enclosure, and in response to the monitoring, adjusting flow of ventilation gas through the enclosure in relation to the level of hazard or risk associated with leakage of fluid from the fluid source in the enclosure.

A further aspect of the invention relates to a method of managing operation of exhaust flowed through a process unit, comprising monitoring at least one condition or operating variable of the process unit determinative of a risk or hazard level, and routing the exhaust to one of multiple alternative exhaust dispositions in response to the risk or hazard level determined from the monitored condition(s) or operating variable(s).

Other aspects, features and embodiments of the invention will be more fully apparent from the ensuing disclosure and appended claims.

DETAILED DESCRIPTION

Figure 1:
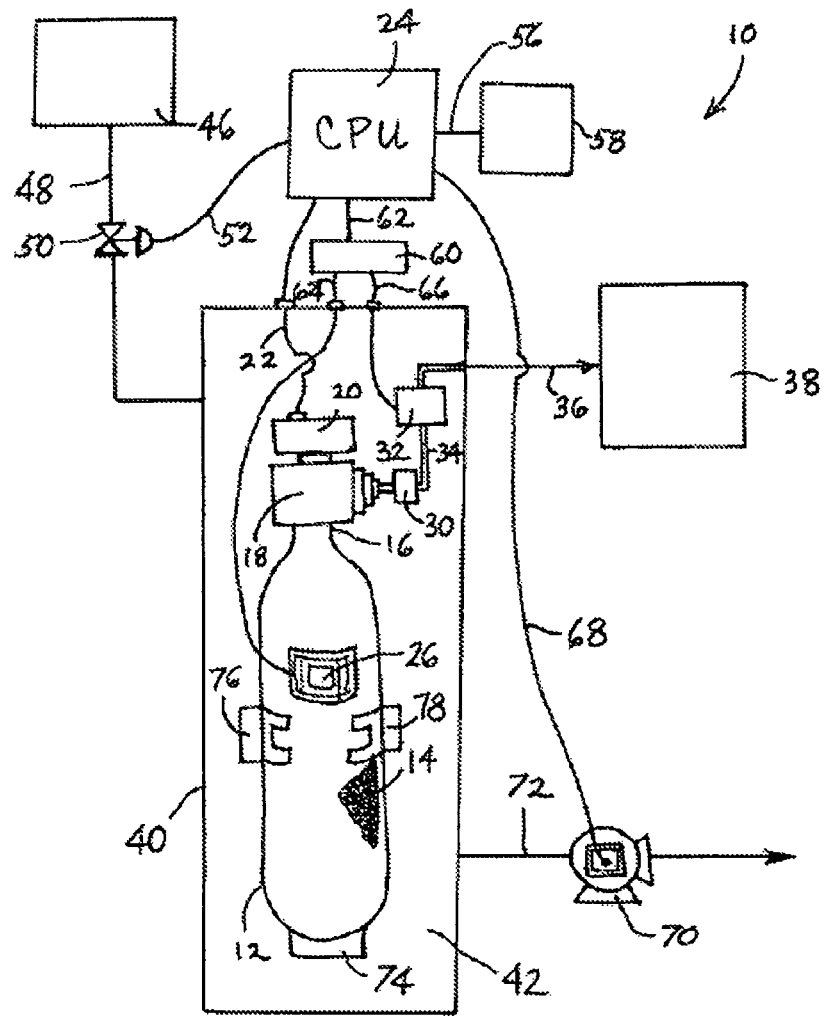
FIG. 1 is a schematic representation of a gas cabinet containing a sorbent-based fluid supply vessel and adapted for modulation of ventilation gas flow in correspondence to fluid inventory in the fluid supply vessel.

The present invention relates to ventilation gas management systems and processes, and more specifically to ventilation gas management systems for enclosures containing fluid storage and dispensing vessels, and to processes for such ventilation gas management.

In one embodiment, the invention contemplates a ventilation gas management system for an enclosure containing a fluid supply vessel and flow circuitry coupled thereto and adapted for flow of ventilation gas through the enclosure, in which the system comprises:

(a) a flow modulator arranged to control ventilation gas flow through the enclosure;

(b) a monitoring assembly adapted to (i) monitor a characteristic of the fluid supply vessel, enclosure, or fluid in or dispensed from the fluid supply vessel, that affects a level of hazard or risk associated with leakage of fluid from the fluid supply vessel or associated flow circuitry in said enclosure, and (ii) output a monitoring signal correlative of the monitored characteristic, and (c) a controller arranged to receive said monitoring signal from said monitoring assembly, and to responsively adjust the flow modulator in relation to the level of hazard or risk associated with leakage of fluid from said fluid supply vessel in said enclosure.

The monitored characteristic in such system can be of any suitable type, and can for example comprise at least one characteristic selected from the group consisting of: fluid inventory in the fluid supply vessel; fluid pressure in the fluid supply vessel; fluid pressure in a gas delivery manifold downstream of the fluid supply vessel; strain in a wall of the fluid supply vessel; weight of the fluid supply vessel containing said fluid; physical adsorbent characteristic of a physical adsorbent disposed in an interior volume of the fluid supply vessel; temperature of the fluid supply vessel; temperature in the enclosure; cumulative volume of fluid dispensed from the fluid supply vessel; duration of fluid dispensing from said fluid supply vessel; flow rate of fluid dispensed from the fluid supply vessel; ambient conditions in said enclosure; fluid conditions in the fluid supply vessel; open or closed character of an access structure of the enclosure; and an alarm condition associated with the fluid supply vessel, flow circuitry, enclosure and/or process consuming the dispensed fluid.

In one embodiment, the monitoring assembly comprises a strain gauge mounted on an exterior wall of the fluid supply vessel and arranged to output a corresponding signal indicative of strain in the vessel wall, as the monitoring signal. In another embodiment, the monitoring assembly comprises a pressure transducer arranged to monitor pressure of fluid dispensed from the fluid supply vessel.

The flow modulator can be of any suitable type, and can for example include a flow control device selected from the group consisting of: flow control valves; dampers; variable-size restricted flow orifice devices; mass flow controllers; variable speed pumps; and variable speed blowers.

The monitoring assembly can include any of a wide variety of specific apparatus components, and may for example include a data acquisition module adapted to be positioned outside the enclosure, and operatively coupled with at least one sensor in the enclosure.

In one embodiment, the characteristic of the fluid supply vessel, enclosure, or fluid in or dispensed from the fluid supply vessel, as used for monitoring, comprises an open or closed character of an access structure of the enclosure. In other embodiments, such characteristic can include an alarm condition associated with the fluid supply vessel, flow circuitry, and/or enclosure.

The controller can be arranged to responsively adjust the flow modulator to increase flow of ventilation gas through the enclosure when an access structure of the enclosure is opened. Alternatively, the controller can be arranged to responsively adjust the flow modulator to reduce flow of ventilation gas through the enclosure upon dispensing of fluid from the fluid supply vessel, to a low "normal level" under non-alarm conditions and closed character of an access structure of the enclosure, and to increase flow of ventilation gas through the enclosure upon occurrence of an alarm condition associated with the fluid supply vessel, flow circuitry, and/or enclosure, or upon the opening of the access structure of the enclosure.

The controller can be arranged in another implementation, to responsively adjust the flow modulator to produce a flow of ventilation gas through the enclosure during dispensing of fluid from the fluid supply vessel in the absence of an alarm or emergency condition, e.g., in a range of from 25 to 80 ft.$^3$ per minute.

In still another arrangement, the controller can be arranged to responsively adjust the flow modulator to reduce flow of ventilation gas through the enclosure during dispensing of fluid from the fluid supply vessel, so that ventilation gas flow through the enclosure is progressively reduced as fluid inventory decreases during the dispensing of fluid.

The controller itself can be or include a computational apparatus selected from the group consisting of; microprocessors; programmable logic controllers; and computers that are programmably adapted for the adjustment of the flow modulator, in response to the monitoring signal.

The above-described ventilation gas management system can be operably deployed with a gas cabinet in a semiconductor manufacturing facility, to modulate flow of ventilation gas through the gas cabinet, e.g., a gas cabinet containing a sorbent-based fluid supply vessel, an internally pressurized regulated fluid supply vessel, a combination of such vessels, or a multiplicity of fluid supply vessels of any one or more of such types, or of other types of fluid supply vessels. Alternatively, the above-described revelation gas management system can be operably deployed with a gas box in a semiconductor manufacturing facility, to modulate flow of ventilation gas through the gas box.

In the instances in which the fluid supply vessel(s) comprise a sorbent-based fluid supply vessel, such vessel may contain as the sorbent medium therein an activated carbon adsorbent.

Fluid may be stored in and dispensed from the fluid supply vessels at any suitable pressure, e.g., sub-atmospheric pressure or near-atmospheric pressure, or low super-atmospheric pressure.

The fluid may be of any suitable type, and may for example comprise a semiconductor manufacturing fluid. The fluid may comprise, without limitation, a fluid selected from the group consisting of hydride gases, halide gases, gaseous organometallic compounds, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

The invention thus contemplates a method of supplying gas from a fluid source in an enclosure through which ventilation gas is flowed, said method comprising monitoring a characteristic of said fluid source, enclosure, or fluid in or dispensed from said fluid source, that affects a level of hazard or risk associated with leakage of fluid from said fluid source or associated flow circuitry in said enclosure, and in response to said monitoring, adjusting flow of ventilation gas through the enclosure in relation to the level of hazard or risk associated with leakage of fluid from said fluid source in said enclosure.

Such method may be carried out with the various features, components, embodiments and arrangements variously described hereinabove, in further and specific implementations thereof.

The invention therefore provides a "smart" enclosure such as a gas box adapted for containing a fluid supply vessel, equipped with a ventilation system and associated controls that allow the enclosure to operate with variable exhaust in an effective and economic manner.

In one embodiment, the enclosure comprises a containment structure in a semiconductor manufacturing facility utilizing an exhaust system for ventilation of the containment structure, in which the exhaust system provides a high flow, e.g., a ventilation gas flow rate of 300-400 ft.$^3$ per minute, that characterizes operation of the containment structure during emergencies, or during maintenance when the enclosure is opened for maintenance, inspection, etc., and in which the exhaust system provides a low flow, e.g., a ventilation gas flow rate of 20-100 ft.$^3$ per minute when the enclosure is operating and no operational issues are detected. The low flow operating regime thus constitutes an efficiency mode, as a default state for the enclosure. The enclosure can be a gas box, gas cabinet, or other enclosure containing fluid supply vessel(s). The low flow operating regime may for example be set at a predetermined ratio in relation to the high flow operating regime. For example, the low flow operating regime may include operation in a flow rate range involving flow rates that are 15%-25% of the flow rates in the high flow operating regime.

The semiconductor manufacturing facility can employ a variable speed fan for the exhaust system, and such fans can be readily adjusted depending on change in pressure in the facility, to transition between the high flow and low flow operating regimes. Lower overall exhaust rates can thereby be achieved.

In various embodiments of the ventilation gas management system, the enclosure is adapted for containing internally pressure regulated fluid supply vessels. Such vessels may contain one or more than one pressure regulator devices in their interior volume, and when more than one such device is employed, the devices are arranged in series, with pressure regulator set points being set for the desired dispensing operation, to achieve a specific pressure level of the dispensed fluid. Such specific pressure level may include sub-atmospheric pressure of the dispensed fluid, or alternatively a fluid pressure level that is relatively low in character, e.g., below 100 kPa.

Thus, during normal operation, exhaust rate in a semiconductor manufacturing facility gas box is reduced, e.g., by utilizing a variable position damper in the duct above the gas box, and when the system requires maintenance, a much higher, safer, exhaust rate is used for such event. The change can be accomplished through the use of programmably arranged control equipment and interconnects, or other suitable manner.

In one embodiment, pressure in discharge gas piping from a fluid supply vessel is monitored, and when pressure above a predetermined threshold value is detected, an alarm is actuated, the fluid supply vessel is isolated from dispensing operation, and flow of dispensed gas to the fluid-utilizing tool is terminated, with the ventilation rate being increased, e.g., to a rate in a range of 300-400 ft.$^3$ per minute. The ventilation rate increase can be a function of the magnitude of the pressure excursion, so that larger excursions are matched by higher ventilation rates in the enclosure containing the fluid supply vessel. The isolation of the fluid supply vessel may be effected by closure of a vessel dispensing valve, e.g., by actuation of a pneumatic valve operator on the vessel, or by actuation of a valve in the piping or a manifold including the piping.

In another embodiment, the enclosure containing the fluid supply vessel can be constructed with a toxic gas alarm that monitors the interior environment of the enclosure for leakage of toxic gas from the fluid supply vessel or from piping or components between the fluid supply vessel and the so-called pigtail by which the vessel is interconnected with dispensing flow circuitry such as a valved manifold. The gas detection and valve closure assembly may be constructed and arranged to comply with International Fire Code, Section 3704.2.2.7 or other safety codes and regulations, in specific embodiments.

In various embodiments of the invention, risk/hazard level of a manufacturing tool can monitored, with respect to specific tool conditions and process variables determinative of such risk/hazard level, and exhaust rate for the tool can be varied to achieve a predetermined risk/hazard level appropriate to the manufacturing tool and process facility containing same. In addition to varying exhaust rates, the invention contemplates re-routing of exhaust in response to monitored conditions, such as from general exhaust to scrubbed exhaust, or from recycle of exhaust to general exhaust, if a high hazard condition is detected. Thus, upon detection of a hazard condition, the monitoring and control system may actuate a re-routing of exhaust flowed through a gas box, from general exhaust to a scrubbing unit, or exhaust flowed through an enclosure and then recycled may be instead passed to general exhaust lines.

Accordingly, the invention relates in another embodiment to a method of managing operation of exhaust flowed through a process unit, comprising monitoring at least one condition or operating variable of the process unit determinative of a risk or hazard level, and routing the exhaust to one of multiple alternative exhaust dispositions in response to the risk or hazard level determined from the monitored condition(s) or operating variable(s). In such method, the exhaust rate can be modulated according to the risk or hazard level determined from the monitored condition(s) or operating variable(s).

The exhaust rate can be increased in response to monitoring of the vessel fluid pressure above a predetermined pressure, e.g., as resulting from increasing temperature ambient conditions that cause warming of the fluid supply vessel and its fluid contents, and when subsequent dispensing operation and/or change (decrease) in temperature causes the vessel fluid pressure to fall below such predetermined pressure, the exhaust rate can be reduced to a lower level for subsequent operation. This arrangement can be effected using a pressure signal from a manifold to which the fluid supply vessel is connected, such as by use of a pressure transducer in the manifold to monitor pressure of the dispensed gas, as indicative of fluid pressure in the vessel.

Thus, in various embodiments, the invention relates to a system and method for monitoring and control of exhaust flow rate in a process system including a gas box/cabinet/enclosure/ventilation assembly including feedback controls, to maintain a desired level of safe fluid storage and dispensing operation, based on detected conditions, such as leakage, pressure, temperature, etc., in air flow passages and/or in fluid vessels.

The exhaust/air/fluid flow control elements can in various specific embodiments include louvered inlet and/or outlet openings comprising slatted slot openings, e.g., wherein the slats are translatable between fully open and fully closed positions, in combination with monitoring devices such as flow meters and pressure transducers.

The sorbent-based fluid storage and dispensing vessels in various embodiments can utilize a variety of sub-systems, assemblies, apparatus and devices for monitoring, control and feedback in the system and process of the invention. For example, the sorbent-based fluid storage and dispensing vessels can utilize a dynamic fluid monitoring assembly to determine the fluid inventory in a vessel from which fluid is being or will be dispensed, capable of generating a monitoring signal that is utilized for control and feedback.

In one embodiment, the monitoring system includes (i) one or more sensors for monitoring a characteristic of the fluid supply vessel or the fluid dispensed therefrom, (ii) a data acquisition module operatively coupled to the one or more sensors to receive monitoring data therefrom and responsively generate an output correlative to the characteristic monitored by the one or more sensors, and (iii) a processor and display operatively coupled with the data acquisition module and arranged to process the output from the data acquisition module and responsively output a graphical representation of fluid in the fluid supply vessel.

The one or more sensors may monitor a characteristic of the fluid supply vessel, such as strain in a structural component of the vessel, which is indicative of the amount of fluid contained in the vessel. For example, the one or more sensors may include a strain gauge secured in strain-sensing relationship to the wall of the vessel, which for example may be usefully employed when the fluid supply vessel is an internally pressure-regulated vessel. In other embodiments, the monitoring sensors may be arranged to monitor a characteristic of the fluid that is dispensed from the fluid supply vessel, such as fluid pressure, fluid temperature, concentration of one or more components of the fluid, flow rate of the fluid, pressure drop in flow circuitry coupled with the fluid supply vessel, and/or cumulative flow rate of the fluid dispensed from the fluid supply vessel.

The fluid storage and dispensing vessels utilized in the ventilation gas management systems and processes of the invention can be of any suitable type, e.g., sorbent-based fluid storage and dispensing vessels of a type commercialized by ATMI, Inc. (Danbury, Conn., USA) under the trademark SDS, or fluid storage and dispensing vessels equipped with internally disposed gas pressure regulators in the interior fluid-holding volume of the vessel, of a type commercially available from ATMI, Inc. (Danbury, Conn., USA) of the trademark VAC. Such regulator-controlled vessels can be utilized with one or multiple regulators in the interior volume, each regulator having a set point selected for safe dispensing operation in the particular arrangement employed. For example, the regulator(s) may be arranged with set points pre-set for dispensing of fluid from the vessel at moderate to low pressure, e.g., sub-atmospheric pressure.

The fluid characteristic that is monitored in the exhaust management system and process can be or include pressure of fluid that is dispensed from the fluid storage and dispensing vessel. The fluid can be of any suitable chemical type, and can for example be a semiconductor manufacturing fluid such as arsine, phosphine, boron trichloride, boron trifluoride, silane, germane, germanium tetrafluoride, or silicon tetrafluoride.

The fluid monitoring system can be arranged to provide a suitable graphical representation of fluid in the fluid supply vessel, e.g., a gas gauge type depiction comprising a two-dimensional area with an upper boundary line, disposed in a rectangular field wherein the position of the upper boundary line of the two-dimensional area in the field indicates fluid inventory in the vessel.

The dispensing flow circuitry associated with the fluid supply vessel can have a wide variety of the fluid monitoring, instrumentation and control elements incorporated therein. For example, the flow circuitry may include a pressure reducing device, such as a restrictive flow orifice (RFO) that is effective to control the rate of discharge of the dispensed fluid from the vessel.

In the operation of the fluid supply vessel, a characteristic of the vessel or dispensed fluid can be monitored, with data being acquired from the monitoring for use in responsively generating an output correlative to the monitoring characteristic, and the output from the data acquisition being processed to generate a graphical representation of fluid in the fluid supply vessel, or other output that reflects the fluid inventory.

In one embodiment, the fluid supply vessel comprises a gas storage and dispensing vessel containing activated carbon adsorbent, with the vessel being mounted in a gas box of an ion implanter apparatus. One or more pressure transducers can be arranged in the gas box to monitor pressure of gas dispensed from the fluid supply vessel, and responsively generate an output indicative of the monitored pressure that is transmitted to a data acquisition module in the gas box. The data acquisition module, in turn, may be arranged to transmit data resulting from the monitoring, to a processor and display located outside of the gas box, via a fiber optic cable interconnecting the data acquisition module and the external processor. The processor can be programmably arranged to determine an amount of fluid remaining in the fluid supply vessel, and to output to the display a visual representation and/or output data reflecting the fluid remaining in the supply vessel in the gas box.

In another embodiment, the processor can be adapted to determine a temperature coefficient for a predetermined endpoint pressure of gas dispensed from the fluid storage and dispensing vessel, normalize pressure sensed by said pressure transducer to a predetermined temperature of the gas box, normalize the endpoint pressure to said predetermined temperature, and apply isotherm equations at such predetermined temperature, to determine the amount of gas remaining in the gas storage and dispensing vessel, which can then be outputted to the display.

In another embodiment including the ventilation gas management system of the invention, the fluid supply vessel may be coupled with flow circuitry including a manifold, with an isolation valve between the manifold and the pigtail associated with the fluid supply vessel. A pressure monitor may be disposed in the manifold to monitor the pressure of the dispensed gas. The pressure monitor may include a pressure transducer and a controller, arranged so that if pressure monitored in the manifold is above a predetermined or set point value, the controller will responsively actuate the isolation valve to close, thereby isolating the manifold from the fluid supply vessel. This manifold valve closure action may be coordinated with operation of the ventilation gas management system to increase the flow of ventilation gas through the enclosure containing the fluid supply vessel.

The manifold may contain a mass flow controller or other flow modulating device therein, and be adapted for evacuation and purging, by connection to vacuum pump, purge gas supply, and other appropriate components.

The manifold in one embodiment is arranged so that the manifold is isolated, or operated to increase or decrease flow of fluid from the fluid supply vessel, in response to ventilation gas flow through the enclosure containing the vessel, or vessel and manifold. The ventilation gas can be treated in the enclosure or exteriorly thereof to purify same to a desired extent, so that the purified gas thereafter can be recirculated, e.g., into the gray room of a semiconductor manufacturing facility, into a clean room of such facility, or other regions of such facility, as desired. The fluid supply arrangement can be regulated based on the ventilation gas characteristics, to achieve the economy and efficiency and operation of the facility, such as by reducing makeup gas requirements for the ventilation gas.

In other embodiments, recycle and reuse of ventilation gas, e.g., air, is utilized to reduce the cost of ownership of the process facility in which the exhaust management system and process of the invention are utilized. The use of sorbent-based fluid storage and dispensing vessels or internally pressure-regulated vessels provides enhanced safety operation that enables less air to be employed for ventilation and circulation through gas boxes, gas cabinets, and other enclosures that contain fluid supply vessels, and by monitoring system components or process conditions associated with the stored, dispensed or utilized fluid, the ventilation gas can be dynamically adjusted in a particularly efficient manner.

Thus, less exhaust air can be required by reduction of ventilation rates, with attendant advantages including avoiding the need to process such exhaust air in a scrubber or treatment system, avoiding separate duct work that would otherwise be required, reducing the size of rooftop scrubbers, and effectively reclassifying gas box exhaust if it is clean, from "scrubbed exhaust" to general or heat exhaust, and combining it with other similar exhaust streams for direct rooftop venting from the facility.

In various embodiments, the invention contemplates an ion implantation apparatus in which the sorbent-based and/or internally pressure-regulated dopant fluid supply vessel and gas box are considered as a system, with the gas box being constructed to lower pressure rating as permitted by the sorbent-based and/or internally pressure-regulated dopant fluid supply vessel. Such approach concurrently enables valves, piping, transducers, mass flow controllers of the flow circuitry to be constructed less expensively. For example, high integrity non-metal piping could be utilized in the flow circuitry, in place of heavy gauge metal piping typically employed for containment of the high-pressure toxic or hazardous gases. Such high integrity non-metal piping can therefore utilize flexible tubing that is readily commercially available in a variety of lengths and diameters, and this in turn reduces cost and the need for welds, connectors, etc. that would otherwise be associated with the flow circuitry.

Another embodiment utilizes a variable-position damper or variable speed fan above a duct of a gas box, so that the flow of ventilation gas through the gas box can be optimized and minimized during normal operating conditions. In prior practice, the flow rate of ventilation gas through a gas box in a semiconductor manufacturing ion implantation operation is maintained at a fixed level, and can be as high as 400 ft.$^3$ per minute (CFM) or even higher. The usage of sorbent-based fluid supply vessels presents an enhancement of operating safety that enables ventilation gas flow rates as low as 25 ft.$^3$ per minute to be utilized. In such arrangement, the position of the damper and/or location and operating speed of the fan can be established based on the operating characteristics of the gas box and fluid supply vessel(s) in the gas box. For example, the position of the damper may be adjusted based on the pressure of the fluid being dispensed, and/or the speed of the fan may be adjusted depending on such pressure level, so that the flow rate of the ventilation gas is modulated in correspondence to the pressure of the fluid being dispensed. Alternatively, the flow rate of ventilation gas can be adjusted by providing variable area louvers in the door of the gas box, for selective adjustment, e.g., to reduce the area of the louvers to decrease the flow and increase the face velocity of the ventilation gas.

In a further embodiment, the exhaust rate of ventilation gas flowed through the gas cabinet for venting thereof can set to operate at a high rate, e.g., in a range of 200-300 CFM, when the door to the gas cabinet is opened, e.g., for installation of fresh fluid supply vessel(s) and removal of fluid-depleted vessels, or otherwise for maintenance operations, and when the door of the gas cabinet is closed, the exhaust rate of ventilation gas flowed through the gas cabinet can be reduced to a low rate, e.g., in a range of 15-120 CFM.

A pressure monitoring signal from the fluid delivery manifold can be used to modulate the exhaust rate of ventilation gas that is flowed through the gas cabinet, or such exhaust rate of ventilation gas can be controlled in response to the fluid inventory in the vessel from which fluid is being dispensed, as determined by any suitable monitoring arrangement. For example, the strain in the vessel wall of the fluid-holding vessel can be monitored, to produce an output that is correlative of the fluid inventory, so that the output may simultaneously be transmitted to a processor and display unit, as previously described, as well as be utilized to modulate the ventilation rate of the gas flowed through the gas cabinet, according to a predetermined relationship between the fluid inventory and ventilation gas flow rate.

When there is a smaller inventory of gas in the vessel, less vent gas will be required to "sweep" the interior volume of the gas cabinet to remove any leakage of such gas that may occur from the vessel. In this manner, by modulating the ventilation gas flow rate in accordance with the gas inventory in the vessel, a substantial savings can be effected in relation to a gas cabinet that is operated at a ventilation rate set to accommodate high pressure gas cylinders, and even in relation to a gas cabinet that is operated at a low constant ventilation gas flow rate that is enabled by low pressure sorbent-based fluid supply vessels.

By "matching" the ventilation gas flow rate to the specific fluid inventory, or to other specific fluid vessel, process system or operating condition characteristics, so that ventilation gas flow rate is varied in correspondence to such parameter, to effect a substantial reduction in ventilation gas that in turn permits a significant savings in associated equipment, such as ventilation gas pumps, blowers, purification apparatus, and the like, so that the necessary maintenance as well as operating expense associated with the ventilation gas flow through the gas cabinet is markedly reduced.

Although the foregoing discussed is directed to gas cabinets, such discussion is likewise applicable to other enclosures in which sorbent-based fluid supply vessels are employed, and through which ventilation gas is flowed in order to sweep any leakage components from the enclosure.

The gas enclosure containing the fluid supply vessel(s) can be arranged in any suitable manner to accommodate the pressure or fluid inventory of the vessel. For example, in one implementation, the system may be arranged so that whenever pressure in the fluid supply vessel is sub-atmospheric or otherwise below a predetermined level, a low ventilation flow rate is allowed, but if the pressure exceeds such level, or other alarm conditions occur, then a high exhaust rate of the ventilation gas is effected. In this manner, the broad approach of the invention can be applied even to enclosure structures in which high pressure gas cylinders are employed, since the pressure of the high pressure gas will diminish as the gas is dispensed, and even high venting gas flow rates can be correspondingly progressively reduced as the gas pressure falls with continued dispensing of gas.

The invention therefore contemplates an integrated approach to ventilation gas usage that avoids the substantial disadvantages of the prior approach of overdesigning the fluid supply vessel enclosure for a worst-case release scenario, and maintaining a ventilation flow rate that continuously accommodated such worst-case release event.

The temperature, pressure or any other conditions in gas cabinet enclosures containing sorbent-based fluid supply vessels can be monitored, and used as a basis for adjusting the ventilation gas flow rate, in various specific embodiments of the invention.

Thus, the invention contemplates the provision of a "smart" enclosure in which the ventilation gas flow rate is matched or triggered in response to the prevailing risk condition(s) associated with the operation of the enclosure involving dispensing of fluid from vessel(s) therein.

The fluid supply vessels in the enclosure can also be arranged so that if a dispensed gas pressure exceeds a predetermined upper limit, an isolation valve between the vessel and the dispensing manifold can be closed, or a flow control valve in a valve head assembly of the vessel can be closed, to terminate the dispensing operation, and the exhaust rate through the enclosure can be increased, e.g., by automatically opening a ventilation gas damper, until such time as conditions are brought back to normal, to provide a further level of safety in the operation of the enclosure and vessel(s) therein.

The modulation of ventilation gas flow rate through a fluid supply vessel enclosure in correspondence to a monitored fluid dispensing parameter, e.g., fluid pressure in the fluid supply vessel, volume inventory of fluid in the vessel, total dispensed fluid volume discharged from the vessel, weight of sorbate fluid in the fluid supply vessel, pressure in the enclosure, temperature in the enclosure, or other appropriate variable, or combination of variables, can be effected by suitable coupling of a sensor or monitor to a processor that is arranged to receive output from the sensor or monitor, and produce a correlative control signal that is used to modulate the volumetric flow rate of the ventilation gas through the enclosure. The processor can be a microprocessor, programmable logic device, general purpose computer specially adapted to carry out the monitoring and control operation, or other processing apparatus effective for such purpose. Alternatively, the signal from the sensor can directly trigger a mitigating action directly, such as isolating the gas cylinder from the system, sounding an alarm, and/or adjusting the position of a damper to permit more ventilation flow.

The output control signal generated by the processor can be of any suitable form that is effective for the modulation. For example, the output signal may be transmitted to energize a pneumatic valve actuator, to open or close a flow control valve, damper or other flow-determining device to a desired extent providing the appropriate flow of ventilation gas through the enclosure, or to increase the pumping rate of a pump or blower used as a motive driver for the ventilation gas.

The present invention achieves a substantial further benefit to the use of sub-atmospheric pressure fluid supply vessels, by reducing ventilation gas requirements, in addition to the following benefits otherwise attendant to the use of such vessels: (i) elimination of the practice of exhausting ion implantation gas boxes through a central roof-top emergency scrubber, e.g., a water scrubber, adsorbent scrubber, or chemisorbent scrubber, so that the size of the house emergency release scrubber can be reduced; (ii) easing of protocols for transporting dopant source gases in semiconductor manufacturing facilities, by relaxing requirements for partial evacuation of personnel from the fluid vessel area, or performing change-outs of fluid supply vessels when the least number of personnel are present in the vicinity of such change-outs, and (iii) increased flexibility in the layout of equipment in the semiconductor manufacturing facility, in configurations in which the most heavily utilized equipment including ion implanters are located at the center of the facility, so that implanters need not be confined to remote areas of the facility, and work flow and logistics can be resultantly improved.

In gas enclosures utilizing the ventilation gas system and process of the present disclosure, the gas enclosure may employ additional enhancements, such as internal baffles to optimize sweep of ventilation gas through the enclosure, and seals on doors and access ports, to control leakage. A specific enclosure application may utilize ventilation gas flow rates that are modulated according to system conditions to achieve different numbers of air changes in the enclosure at different conditions, or different pressures in the enclosure at different conditions, or other variable response results.

The modulation of ventilation gas flow rate permits the facility utilizing same to generate less "conditioned air" and to reduce gas monitoring and abatement of the exhausted air that is produced in the operation of the enclosure containing the sub-atmospheric pressure dispensed fluid supply vessels.

In typical semiconductor manufacturing system operation, clear air is produced in the facility by a sequence of steps including (1) filtering of outside air, (2) refrigeration of the filtered air to dehumidify same, (3) heating the dehumidified air to typically 68° C.-70° C., and (4) adding steam to rehumidify the air back to typically 38° C.-40° C. relative humidity. By reducing exhaust rate, substantial savings can be achieved in make-up air requirements, cooling, dehumidifying, heating, monitoring, detection, and building costs.

Thus, the dynamic modulation of the ventilation gas flow rate in response to fluid dispensing system and process parameters provides substantial and unexpected improvements in the system and process, since it thereby becomes possible to substantially reduce energy consumption and capital and operating costs of a facility utilizing sorbent-based and/or internal regulator-based fluid supply vessels in enclosures, with increases in ventilation and exhaust gas equipment mean time between failures (MBT), so that maintenance and repair burdens associated with house exhaust and ventilation systems are dramatically reduced. The fluid-utilizing facility as a result becomes significantly more efficient, and ventilation and exhaust requirements associated with the enclosed fluid supply vessels can be relaxed and make-up, monitoring and control requirements reduced, so that gas resources in the facility can be more effectively utilized.

In application to semiconductor manufacturing facilities, such dynamic modulation of ventilation gas flows provides a major contribution to cost reductions and energy efficiency. In semiconductor manufacturing facilities, various regions of the facility very in cleanliness from Class M1 (ISO Class 3) to Class M6 (ISO Class 9), and clean rooms utilize recirculation air handlers moving millions of cubic feet of air to maintain cleanliness conditions. Semiconductor facilities may utilize over 450 kWh of energy for every 200 mm wafer processed in the facility, and nominally 60% of energy consumption in the facility is attributable to facility systems, including chillers, air re-circulation and make-up fans, exhaust air systems and on-site nitrogen plants. The remaining 40% of energy consumption is attributable to process equipment, of which process pumps are the major energy consumers.

As an illustrative example of the savings achievable by such dynamic modulation of ventilation gas flows in a semiconductor manufacturing facility, a reduction of 200 ft.$^3$ per minute in exhaust gas requirements can provide a reduction in electrical demand by 2.2 kW and save over 12,000-18,000 kWh per year in fan and chiller energy required for make-up air-conditioning. This in turn can reduce average energy costs to $6-$8/cubic foot per minute per year for the facility.

It will be recognized that dynamic modulation of ventilation gas flows is applicable to single-vessel fluid supply vessel enclosures, in which the ventilation gas flow can be modulated in correspondence to the pressure and/or volume characteristics of the fluid being stored in and dispensed from the single vessel, as well as to multi-vessel fluid supply vessel enclosures, in which individual vessels may be of varying condition—i.e., one or more of such vessels may be fully filled, while one or more others of such vessels may be empty or near empty, while one or more others of such vessels may be at some intermediate condition of pressure and fluid volume therein.

It may therefore be necessary in such multi-vessel fluid supply vessel enclosures to utilize integrated monitoring systems in which each of the respective vessels in the enclosure is separately monitored with respect to its inventory of fluid, fluid pressure, pressure of dispensed fluid therefrom, etc., and in which the resulting monitoring data are processed to provide an overall controlled level of ventilation gas flow through the enclosure. Such integrated flow may for example include strain gauges on each of the multiple vessels in the enclosure, each generating an output correlative of the inventory and pressure of the fluid in the vessel, and linked to data acquisition and processor modules that integrate, totalize or otherwise accumulate and process the data to provide an output control signal that is utilized to modulate the ventilation gas flow through the enclosure.

Modulation of the ventilation gas flow through the enclosure may in turn be detected in any suitable manner, including the aforementioned adjustment of position of dampers, louvers, or the like, adjustment of flow control valves in ventilation gas feed lines carrying the ventilation gas to the enclosure containing the fluid supply vessels, adjusting speed of pumps utilized to pump the ventilation gas to the enclosure and/or to exhaust the enclosure of such ventilation gas, or in any other suitable manner by which the volumetric flow rate or amount or velocity of the ventilation gas is adjusted to a desired extent based on the monitored equipment or conditions associated with the fluid supply operation.

In one embodiment, the enclosure containing multiple fluid supply vessels is compartmented, to provide a separate sub-enclosure for each of multiple vessels in the enclosure, so that ventilation gas modulation can be carried out in a simple and ready manner for each of the sub-enclosures containing a separate one of the multiple vessels.

In such arrangement, as an illustrative example, a fluid supply vessel containing a full inventory of fluid at maximum fill pressure, e.g., 2.2 liters of arsine at a pressure of 700 Torr (=93.3 kPa), in a sub-enclosure holding only such vessel, may be ventilated by flow of ventilation gas through such sub-enclosure at a rate of 75 ft.$^3$ per minute. If such vessel then is utilized for active dispensing, the pressure of arsine in the vessel will decline with continued discharge of arsine until the vessel is exhausted and only a "heels" residue of arsine remains. By continuously, or alternatively in stepwise fashion, matching the ventilation rate through the sub-enclosure to the monitored pressure of arsine in the vessel, the ventilation gas flow rate may for example decline to 60 ft.$^3$ per minute when the arsine pressure in the vessel decreases to 500 Torr (=66.7 kPa), and the ventilation gas flow rate may for example decline to 45 ft.$^3$ per minute when the arsine pressure in the vessel decreases to 350 Torr (=46.7 kPa), etc.

Accordingly, partitioning of a multi-vessel gas supply vessel enclosure into dedicated sub-enclosure portions can accommodate independent control of ventilation gas flow through each of such sub-enclosure portions, to further optimize the ventilation gas flow in a manner consistent with the highest level of safe operation accommodating leakage events from a fluid supply vessel or its associated flow circuitry in the enclosure.

The ventilation gas modulation may be integrated with exhaust gas processes in the fluid-utilizing facility, such as use of exhaust gas for removal of the heat from process equipment in the fluid-utilizing facility, as so-called heat exhaust. Air may be used as heat exhaust to convectively remove heat from process equipment, as well as to entrain any leaking gas from such equipment and thereby minimize concentration levels of toxic or hazardous components. In a semiconductor manufacturing facility, the heat exhaust is typically sent to outside, general exhaust processing, and gas box air exhaust is typically sent to scrubbed exhaust. General exhaust processing may utilize a rooftop or other location for treating the general exhaust and discharging same to the atmosphere. The scrubbed exhaust typically undergoes liquid/gas scrubbing operation, to remove any toxic or hazardous species from such exhaust gas.

In one embodiment, wherein sorbent-based or internally pressure-regulated fluid supply vessels are employed in the gas box of an ion implanter to supply dopant gas to the ion source of such process system, the heat exhaust is re-routed and passed through life safety monitoring equipment for detection of any hazardous or toxic species, prior to being recycled for use in the semiconductor manufacturing facility. In such embodiment, the gas box exhaust from the gas box of the ion implanter is re-routed to general exhaust, being passed through life safety monitoring equipment for detection of any hazardous or toxic species, and then passed to the general exhaust treatment unit, e.g., a roof-mounted exhaust treatment unit. Such modification is facilitated by use of the sorbent-based or internally pressure-regulated fluid supply vessels and the low discharge pressure of the dispensed gas from the fluid supply vessels.

In a semiconductor manufacturing facility, the facility's exhaust requirement derives from several categories, namely, heat/general exhaust, acid exhaust, optional ammonia exhaust, and volatile organic compound (VOC) exhaust. The majority of the process effluent is small in volumetric rate of production, e.g., on the order of 2-10 ft.$^3$ per minute, and point-of-use abatement systems are utilized to keep toxic and hazardous materials out of ducts in the facility and to limit exposure to personnel. Process effluent flows through centralized acid exhaust and exits via roof scrubbers. Wet bench process exhaust flows directly to roof-mounted scrubbers because of the high flow rates involved. Heat exhaust is vented in an untreated state, or in some cases, is sent back to the semiconductor facility.

In general, process tools and gas/chemical areas use containment enclosures for safety. Such process enclosures frequently are run at negative pressure in relation to the manufacturing facility as a whole, in order to further limit the potential of toxic and hazardous materials in the work zone. Pyrophoric and flammable materials demand much higher exhaust levels. Ion implanters typically utilize exhaust flow rates in a range from 1500 to 3500 ft.$^3$ per minute, which is allocated to process exhaust (1-2 ft.$^3$ per minute), gas box exhaust (300-400 ft.$^3$ per minute), and the remainder heat exhaust. Facility air may be drawn through louvers in enclosures to cool power supplies and high energy components therein, with exhaust of such gas through vent stacks on the top of the process tool. Exhaust air temperatures may range from about 75 to 85° F. Since a mishap in the process exhaust piping or a significant release of fluid in the gas box has the potential to contaminate the heat exhaust, a large majority of semiconductor manufacturing facilities vent heat exhaust at a flow rate of 1000-2000 ft.$^3$ per minute to the house central exhaust system, either heat exhaust or acid exhaust.

The ventilation gas modulation discussed in this disclosure can achieve exhaust reductions of 50-75%, in relation to corresponding process systems lacking such ventilation gas modulation.

Concerns about introduction of low levels of toxic components back into the semiconductor manufacturing facility can be addressed and resolved by use of a chemical filter to chemisorb materials that may be present in the heat exhaust. The chemical filter is advantageously characterized by kinetically fast operation and low pressure drop. A toxic gas monitor may be used to verify performance of the chemical filter. The implanter gas box can be vented to a roof scrubber, and the use of sub-atmospheric sorbent-based fluid supply vessels in accordance with the invention enables a significant reduction in the gas box exhaust, e.g., to below 100 ft.$^3$ per minute. The process effluent can be treated with a point-of-use scrubber or be vented through the central acid scrubber of the process system. In such system, an optional heat exchanger can be employed to remove the heat load, or the heat load can be removed using an existing re-circulation/chiller capability of the facility.

The return of the heat exhaust to the utility area can reduce the exhaust requirement of an implanter substantially, e.g., by about 1500 ft.$^3$ per minute in some cases, with substantial attendant energy savings. In instances in which an existing process facility is modified to route the implanter heat exhaust to the utility zone, the re-routing effectively expands the capability of the existing exhaust system, freeing volumetric capacity for other process equipment.

Thus, the dynamic modulation of ventilation gas flow based on process system operation conditions and equipment components enables substantial improvements in cost and efficiency to be achieved. Heretofore, gas cabinet exhaust rates have been based on worst-case release scenarios, as determined for starting pressure of the fluid supply vessel, and the restrictive flow orifice (RFO) diameter employed in the gas dispensing flow circuitry.

The worst-case release rate from fluid supply vessels can be substantially lowered by effective reduction in pressures at which gas is dispensed from the fluid supply vessels. This is especially the case when sorbent-based fluid supply vessels are utilized that store the sorbate gas at sub-atmospheric pressures. In the case of internal regulator-based fluid supply vessels, the set point of the internal regulator is established to permit dispensing of fluid at desired pressure, e.g., pressure ranging from sub-atmospheric pressure to 100 prig (=689.5 kPa).

In both instances, the delivery rate of the dispensed gas can be determined by utilizing an RFO in the flow circuitry associated with the fluid supply vessel. In such manner, gas flow rates can be more closely matched to actual process needs, with lowering of the worst-case release rate by about 4-10 times, in relation to conventional use of high-pressure gas cylinders. In consequence, cabinet ventilation rates can be correspondingly reduced.

Additional savings can be achieved by locating fluid supply vessels closer to process tools utilizing the dispensed fluid, thereby avoiding the cost of long piping runs in the facility. Since the risk associated with high pressure cylinders can be reduced by a factor of 1000 by use of a sub-atmospheric pressure operation, fluid supply vessels can be relocated hundreds of meters closer to the point of use, and the efficiency of the overall facility arrangement can be markedly improved.

The dynamic modulation of ventilation gas can also be utilized with equipment such as wet benches and chemical tanks that are in ventilated housings or confined areas of the facility.

Referring now to the drawings, FIG. 1 is a schematic representation of a gas cabinet 40 containing a sorbent-based fluid supply vessel 12 and adapted for modulation of ventilation gas flow in correspondence to fluid inventory in the fluid supply vessel, as part of a fluid-utilizing process system 10.

As illustrated, the gas cabinet 40 provides an enclosure defining an interior volume 42, in which the fluid supply vessel 12 is mounted, being reposed on a base member 74 and held in vertically upright position by brackets 76, 78 secured to a wall of the cabinet 40.

The fluid supply vessel 12 includes a casing defining an interior volume of the vessel, in which is disposed a physical adsorbent material 14, which in one embodiment of the invention may comprise a monolithic activated carbon article having sorptive affinity for the fluid to be stored on the adsorbent and dispensed from the vessel under dispensing conditions. The fluid may for example comprise a semiconductor manufacturing gas, such as arsine, phosphine, boron trifluoride, silane, or other fluid.

The vessel casing is joined at its upper neck portion 16 to a valve head assembly 18 containing a flow control valve which is openable to dispense fluid from the vessel under dispensing conditions involving a pressure differential between the interior volume of the casing and the external flow circuitry including dispensing line 34 joined to an output port of the valve head assembly 18. The valve head assembly 18 in turn is coupled with valve actuator 20, which is actuatable to open or close the valve in the valve head assembly 18.

On an exterior surface of the vessel casing is mounted a fluid inventory monitor 26 operatively arranged to monitor fluid inventory in the vessel and to output a correlative signal indicative of the amount of contained fluid, in signal transmission line 64. The fluid inventory monitor 26 can be of any suitable type, and may be operatively linked to pressure and/or temperature sensors disposed in the interior volume of the vessel to monitor pressure in the vessel and/or temperature of the sorbent therein, to provide an output indicative of the amount of fluid remaining in the vessel for dispensing.

Although the vessel shown in FIG. 1 is of a sorbent-based type, the vessel alternatively could be of a type that is equipped with one or more pressure regulators in the interior volume of the vessel, which are arranged for dispensing gas from the vessel at a predetermined dispensing pressure determined by the conditions in the fluid flow circuitry coupled with the vessel. Such pressure-regulated vessels may utilize a fluid inventory monitor of a same or similar type, or alternatively may employ a different type of monitor, such as a strain gauge, in view of the fluid storage pressures within such vessels enabling strain gauges to be effectively used.

Referring again to FIG. 1, the dispensing line 34 may contain therein a restrictive flow orifice 30 that is operative to assist in maintaining a desired flow of the dispensed fluid in the dispensing line. The dispensing line 34 may further contain a pressure transducer 32, which is operative to monitor pressure in the dispensing line and responsively output a signal indicative of the sensed pressure, in signal transmission line 66.

From the dispensing line 34 of the flow circuitry coupled with the vessel in gas cabinet 40, dispensed fluid is flowed in feed line 36 to the fluid-utilizing unit 38. The fluid-utilizing unit may comprise a vapor deposition chamber for chemical vapor deposition or atomic layer deposition of a thin-film material on a semiconductor substrate, or an implanter for ion implantation of dopant species deriving from the fluid dispensed from a vessel 12, or other fluid-utilizing process unit.

The process system 10 further includes a central processing unit (CPU) 24 that is operatively linked by output signal transmission line 56 to display 58.

A ventilation gas supply 46 is coupled in flow communication relationship with interior volume 42 of the gas cabinet 40, by ventilation gas feed line 48 containing flow control valve 50 therein. The interior volume 42 of the gas cabinet 40 also is coupled in flow communication relationship with ventilation gas discharge line 72 containing exhaust pump 70 therein. It will be realized that the system shown in FIG. 1 is of a simplified schematic character, and that in a conventional gas cabinet, the ventilation gas is typically flowed from the bottom or base of the enclosure and pulled through a duct at the top or top rear of the box.

The CPU 24 is connected in signal receiving relationship via signal transmission line 62, to data acquisition module 60, which in turn is coupled to the aforementioned fluid inventory monitor 26 and a pressure transducer 32 via signal transmission lines 64 and 66, respectively.

The CPU 24 also is connected by signal transmission line 52 to flow control valve 50 in ventilation gas feed line 48, and by signal transmission line 68 to a speed control unit of exhaust pump 70 in ventilation gas discharge line 72.

Finally, the CPU 24 is connected by signal transmission line 22 to valve actuator 20 coupled with the valve in valve head assembly 18.

In operation, the dispensing of fluid may be initiated by a cycle time program executed by the CPU 24, which transmits an actuation signal in signal transmission line 22 to the actuator 20 to cause the valve in the valve head assembly 18 of the fluid supply vessel 12 to open. By such action, a pressure differential is established between the interior volume of the fluid supply vessel, and the dispensing line 34, so that fluid is desorbed from the physical adsorbent 14 in the vessel to facilitate discharge of fluid from the vessel.

At the same time, the CPU 24 transmits control signals in signal transmission line 52 to ventilation gas flow control valve 50, and in signal transmission lines 68 to the speed control unit of exhaust pump 70. In this manner, ventilation gas is caused to flow through the interior volume 42 of gas cabinet 40, at a low flow rate that may for example be in a range of 25 to 80 ft.$^3$ per minute, such low flow rate reflecting the fact that fluid in the fluid supply vessel 12 is at low subatmospheric pressure. The fluid may be dispensed from fluid supply vessel 12 at a pressure of for example 700 Torr (=93.3 kPa) and flowed in dispensing line 34 and a feed line 36 to the fluid-utilizing unit 38.

During such dispensing operation, the characteristic(s) correlative of the fluid inventory in the vessel is sensed by the fluid inventory monitor 26 and utilized to generate an output signal correlative of the fluid inventory in the fluid supply vessel 12. This output signal is transmitted in signal transmission line 64 to the data acquisition module 60. The pressure transducer 32 in dispensing line 34 monitors the pressure of the discharged fluid, and transmits a corresponding signal in signal transmission line 66 to data acquisition module 60. The data signals received by the data acquisition module then are used to generate an output signal transmitted in signal transmission line 62 to CPU 24.

The CPU 24 processes the output signal from the data acquisition module, and may generate an output that is transmitted in signal transmission line 56 to display 58 as a graphical representation, which may in one embodiment include a graphical simulation of the fluid vessel with an indicator bar or fluid level depicting the amount of fluid left in the vessel. Alternatively, the display 58 may be programmably arranged to output data in a specific format of desired character.

As the fluid dispensing operation proceeds, the inventory of fluid in the fluid supply vessel 12 progressively declines, and such progressive diminution of fluid inventory is monitored by the strain gauge 26 and a corresponding signal is outputted to the data acquisition module and from thence to the CPU to provide a corresponding real-time value of the fluid amount in the vessel, or of the pressure in the vessel. Concurrently, the signal from the pressure transducer 32 is transmitted to the data acquisition module and thence to the CPU 24, to provide a pressure reading monitoring of the dispensed fluid.

Based on these inputs, the CPU will determine an appropriate level of ventilation gas flow, and correspondingly modulate the flow control valve 50 with a control signal in signal transmission line 52, and modulate the speed control of the exhaust pump 70 by a control signal transmitted in signal transmission lines 68, so that the ventilation gas flow is matched to the fluid inventory and pressure conditions being monitored.

The CPU will continue to receive signal inputs from the monitoring devices through the data acquisition module has dispensing of fluid proceeds, and will modulate the flow rate of ventilation gas through the gas cabinet to maintain a required level of safety accommodating any leakage condition. Thus, as the inventory of fluid in the vessel 12 declines, the CPU 24 will correspondingly down-modulate the flow rate of ventilation gas passed through the interior volume 42 of the gas cabinet 40, so that the ventilation gas flow rate will decline in relation to and correspondence with the fluid inventory and pressure being monitored. Such controlled reduction of the ventilation gas flow may be continuous or stepwise in character, as necessary or desirable in a given application of the process system.

The fluid inventory and the dispensed fluid pressure monitoring arrangement may also be employed as an empty detect system, in which production of fluid inventory and/or fluid pressure to a specific lower limit value will cause the CPU to close the valve in the valve head assembly of the fluid supply vessel, and concurrently terminate the flow of ventilation gas through the gas cabinet, so that the fluid supply vessel can be changed out by removal of same from the gas cabinet, and replacement of the removed vessel with a fresh fluid supply vessel. The CPU 24 may also be arranged in output communication with alarm or other output devices, to alert operators to the impending exhaustion of fluid from the fluid supply vessel, and the need to change out the fluid-depleted vessel.

The CPU 24 may therefore be programmably arranged with a computational set of instructions, embodied in hardware, software, firmware or otherwise, to carry out the monitoring and control of the fluid dispensing operation and ventilation of the enclosure containing the fluid supply vessel.

Figure 2:
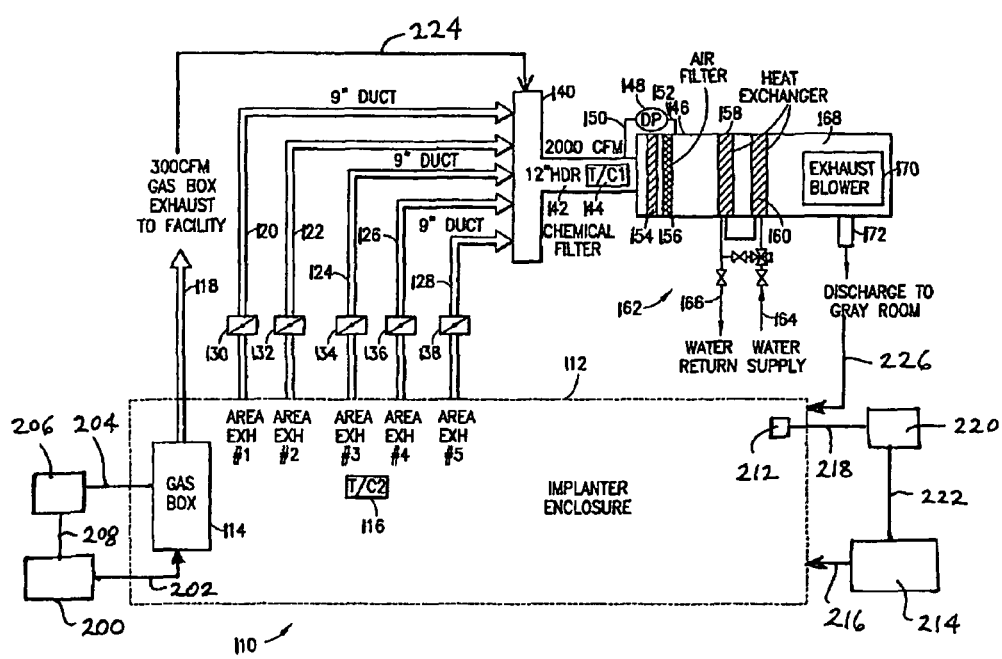
FIG. 2 is a schematic representation of a semiconductor manufacturing process facility requiring use therein of air exhaust for its operation, in which ventilation of the gas box and implanter enclosure are modulated in accordance with process conditions therein.

FIG. 2 is a schematic representation of a semiconductor manufacturing process facility 110 requiring use therein of air exhaust for its operation, in which ventilation of the gas box 114 and implanter enclosure 112 are modulated in accordance with process conditions therein.

The semiconductor manufacturing facility 10, or fab, may comprise a structural installation, e.g., a building or other structural edifice, including clean room, gray room and other installation areas of the facility. The fab includes an ion implanter tool that is contained in an implanter enclosure 112 that has a gas box 114 mounted therein, together with ancillary equipment that is well-known in the art and requires no elaboration herein.

The implanter enclosure may be constituted by a housing or containment vessel that is louvered or otherwise provided with openings therein (not shown) for ingress into the interior volume of the enclosure of air and flow therethrough for removal of heat and sweep-out of any leakage of contaminant species from the gas box or associated flow circuitry in the enclosure. The resulting heat exhaust is discharged from the implanter enclosure in discharge ducts 120, 122, 124, 126, and 128, having flow control dampers 130, 132, 134, 136 and 138 therein, respectively. The discharge ducts may be selectively positioned at the top wall of the implanter enclosure, at locations (e.g., at exhaust areas designated in FIG. 2 as "AREA EXH #1," "AREA EXH #1," "AREA EXH #2," "AREA EXH #3," "AREA EXH #4" and "AREA EXH #5") that provide effective hydrodynamic flow-through of the heat exhaust, into the respective ducts, which in the illustrative embodiment shown may have a diameter on the order of 9 inches.

The implanter enclosure 112 may have any suitable monitoring and control means therein, as necessary or desirable for the operation of the ion implantation tool, and air exhaust operation. For example, the enclosure may have a thermocouple 116 or other temperature sensing device in the enclosure, which is suitably integrated with a centralized control unit, such as a programmably arranged central processing unit (CPU), microprocessor, programmable logic controller (PLC) system, or other means for effective operation of the implanter. For example, the thermocouple 116 may be operatively coupled with a controller that responsively adjusts the settings of the flow control dampers 130, 132, 134, 136 and 138 to modulate the flow of the heat exhaust in proportion to the heat being generated in the implanter enclosure 112. The flow circuitry although shown schematically can include any suitable piping, conduits, flow passages, manifolding, etc., as appropriate to the specific air exhaust employed in the processing facility. The gas box of the implanter as shown discharges a gas box exhaust in discharge line 118. The gas box exhaust may in a specific embodiment be discharged at a flow rate of 300-400 cubic feet per minute (CFM).

The ion implanter, although shown schematically, can and typically does include an ion implantation process chamber, a gas cabinet containing the source gas for the implant operation, a vacuum pump, a beam launch, a control cabinet, an end station, a stocker and a mini-environment, etc., as components for conducting the ion implant operation. The source gas for the ion implantation operation can be supplied by dispensing from a low pressure dopant source of the type described in Tom et al. U.S. Pat. No. 5,518,828, which will permit the gas storage and delivery unit to be exhausted at flow rates on the order of 50-100 CFM. Alternatively, any other suitable source of the ion implantation species can be employed.

Although not shown for ease of illustration, the ion implanter tool produces an ion implantation process effluent which is discharged from the tool in an effluent line and may be flowed to a roof-mounted abatement system of the fab, or alternatively may be flowed to a point-of-use abatement unit to treat the process effluent containing ionic fragments, recombined species, carrier gas, etc., followed by flow of the locally treated process effluent to the house exhaust system for final treatment and discharge. Such point-of-use abatement unit can be of any suitable type, e.g., a catalytic oxidation unit, a scrubber unit (wet and/or dry), etc.

From the discharge ducts 120, 122, 124, 126, and 128, the air exhaust (heat exhaust) from the implanter enclosure flows into the header 140, which in a specific embodiment is a 12-inch header receiving the combined air exhaust at a flow that may be on the order of 2000 CFM. From the header, the combined air exhaust flows into the discharge passage 142 containing thermocouple 144 therein for monitoring the temperature of the air exhaust, and passes into the air exhaust treatment unit 146 containing chemical filter 154, air filter 156, heat exchangers 158 and 160 (coupled by flow circuitry 162 including valved water supply line 164 and water return line 166 to a suitable source of cooling water (not shown)), and at the downstream end portion of the interior volume of the air exhaust treatment unit, the air exhaust enters exhaust blower 170, and is finally discharged in discharge conduit 172 for recirculation to an ambient air environment of the fab, e.g., to the gray room of the fab, so that the recirculated air exhaust rejoins the open air volume in the fab building.

The exhaust treatment unit 146 may be provided, as shown, with a differential pressure gauge 148 coupled to upstream piping leg 150 and downstream piping leg 152, to provide a pressure sensing output. The pressure sensing output may in turn be employed to modulate the speed of the exhaust blower 170, or otherwise be used to adjust, monitor or control the operative elements of the exhaust handling system.

In like fashion, the temperature of the heat exhaust that is sensed by thermocouple 144 may be employed to responsively modulate the flow of coolant in the flow circuitry 162 to ensure that the desired cooling of the heat exhaust is achieved, so that it is suitable for recirculation to the fab.

The heat exhaust treatment unit 146 in this embodiment is provided in a housing as a unitary module. The chemical filter 154 may comprise any suitable material having sorptive affinity for undesirable contaminant components that may be present in the heat exhaust gas stream. The sorbent material may comprise two or more sorbent species, or alternatively may comprise a single material that is effective to purify the heat exhaust of undesirable components thereof. The scrubber material may comprise chemisorbent media or physical sorbent media, or a combination of the two.

The sorbent material may be provided in any suitable form, e.g., in a particulate form or in other discontinuous form, of regular or irregular geometric shape, and of suitable size and size distribution to provide appropriate surface area to the heat exhaust in the contacting operation during which the heat exhaust is scrubbed of undesirable contaminants. The scrubbing material therefore may be provided in a fixed bed, through which the heat exhaust gas stream is flowed. Such bed may be sized and shaped to provide appropriate pressure drop and through-flow characteristics, consistent with basic fixed bed adsorbent vessel design considerations.

One preferred scrubber material usefully employed in the practice of the invention is S520 resin (commercially available from ATMI, Inc., Danbury, Conn., USA), which is effective to remove hydrides as well as acid gas contaminants (e.g., boron trifluoride) from the heat exhaust. The scrubber material may be provided in a honeycomb form to achieve superior capture of the contaminant species, while maintaining low pressure drop in the chemical filter of the treatment unit.

The air filter 156 may be of any suitable type, as effective to remove particulates form the heat exhaust. Although illustratively shown downstream of the chemical filter, it will be appreciated that an air filter may alternatively, or additionally, be provided upstream of the chemical filter.

The heat exhaust purified of contaminants by contact with the scrubber material and filtered of particulates by contact with the air filter 156 then is flowed through the heat exchangers 158 and 160. The heat exchangers may as illustrated communicate with coolant feed lines, whereby a coolant medium is flowed into the heat exchanger in heat exchange passages therein, for cooling of the heat exhaust, with discharge of the coolant medium from the heat exchanger in coolant discharge line 166. The discharged coolant in line 166 thus removes heat from the heat exhaust. Alternatively, the heat exchanger components may effect expansion cooling of the heat exhaust, or other modality and means may be employed for effecting removal of heat from the heat exhaust.

The heat exchangers are an optional component of the air exhaust treatment unit, and may be omitted in instances where the fab has ample cooling capacity built into its HVAC systems, since fab air is continually recirculated through chillers and filters in the fab environment.

The air exhaust treatment unit may further contain a toxic gas monitor, by which the heat exhaust is monitored for the presence of any contaminant species therein. The toxic gas monitor may be positioned upstream of the chemical filter to alert operators when a leakage event has occurred and is in progress (when the influent air exhaust to the air exhaust treatment unit is contaminated by leakage or other contamination).

Alternatively, the toxic gas monitor can be deployed downstream of the chemical filter, to provide an alarm or other output indicating that contaminated air exhaust is breaking through the chemical filter.

As a still further alternative, the air exhaust treatment unit may include toxic gas monitors upstream and downstream of the chemical filter. The toxic gas monitor(s) in such instance can be arranged to actuate shut-down of the implanter, terminate flow of dopants, shut down the implant blower, increase flow of gas box exhaust while maintaining negative pressure therein (so that contamination is swept away and does not mix with the heat exhaust), etc.

Alternatively, the toxic gas monitor may be arranged to actuate an alarm to alert an operator to change out the chemical filter, to replace the scrubbing medium with fresh material.

By flow of the treated heat exhaust to the ambient environment of the fab, the added burden of gas that would otherwise exist, if the heat exhaust were flowed to the house exhaust system is avoided. As a result, the house exhaust system may be smaller and more efficiently designed for the final treatment of exhaust air from the fab.

The air exhaust treatment unit is advantageously configured as a high throughput, high kinetic efficiency air purifier/filter installation that enables the heat exhaust to be returned to the fab. Such air purifier/filter installation may be sized and constructed to enable linear velocities of suitable magnitude, e.g., from about 0.1 to about 2 meters/second, to be achieved in the flow of the heat exhaust through the air purifier/filter unit.

By the provision of such dedicated air exhaust treatment unit, in a typical semiconductor manufacturing facility of the type schematically shown in FIG. 2, it is possible to reuse 1000-2000 CFM of heat exhaust per ion implanter in the fab, which would otherwise have been flowed to the roof abatement unit in prior practice. Since this recirculated heat exhaust rejoins the gaseous environment in the fab, from which make-up air is drawn for use in the tool to remove heat therefrom, a substantial savings is achieved. Since the overall house exhaust requirements are decreased, it is possible to achieve a capital cost reduction on the order of U.S.$100/CFM in the house exhaust system in new fab construction.

In a further modification of the semiconductor manufacturing process system shown in FIG. 2, the exhaust that is reconditioned and discharged in discharge conduit 172 for recirculation may be flowed in recycle line 226 to the implanter enclosure as additional exhaust air therefor.

As another variant, a pressure transducer, thermocouple, or other sensor element 212 may be disposed in the interior volume of the implanter enclosure 112 to monitor the internal environment within such enclosure and to transmit a corresponding sensing signal in signal transmission line 218 to the processor 220, which is programmably arranged to transmit a corresponding output signal in signal transmission line 222 to exhaust source 214, causing flow of exhaust in line 216 to the implanter enclosure, so that the flow of exhaust is adjusted in response to the monitored condition or equipment sensed by sensor element 212.

Still further, as another variant, a dedicated supply 200 of ventilation gas may be arranged for flow of ventilation gas through feed line 202 to the gas box 114 for flow therethrough. The gas box exhaust, instead of being flowed to the exhaust facility, can be recycled in recirculation line 224 to the header 140, for processing and recirculation to the implanter enclosure.

A condition in the gas box may be monitored by a suitable sensor (not shown) that generates an output signal that is transmitted in signal transmission line 204 to controller 206. The controller 206 responsively to such sensing generates a control signal that is transmitted in signal transmission line 208 to the supply 200 to modulate the operation of same, so that the ventilation gas flow is coordinated, e.g., proportionally or in some other correlative manner, to the sensed condition in the gas box.

The sensed condition in the gas box made for example be the inventory of fluid remaining in the fluid supply vessel in the gas box, and/or pressure of dispensed fluid from such fluid supply vessel.

As a further variant, the reconditioned gas in line 226, instead of being flowed to the implanter enclosure, can be flowed into the gas box 114 as ventilation gas therefor.

It will be recognized from the foregoing that the ventilation gas may be derived from a wide variety of sources in the first instance, and that the ventilation gas can be effectively modulated to decline with decreasing inventory of fluid in a fluid supply vessel in the enclosure, to thereby minimize ventilation gas requirements in the process facility.

Figure 3:
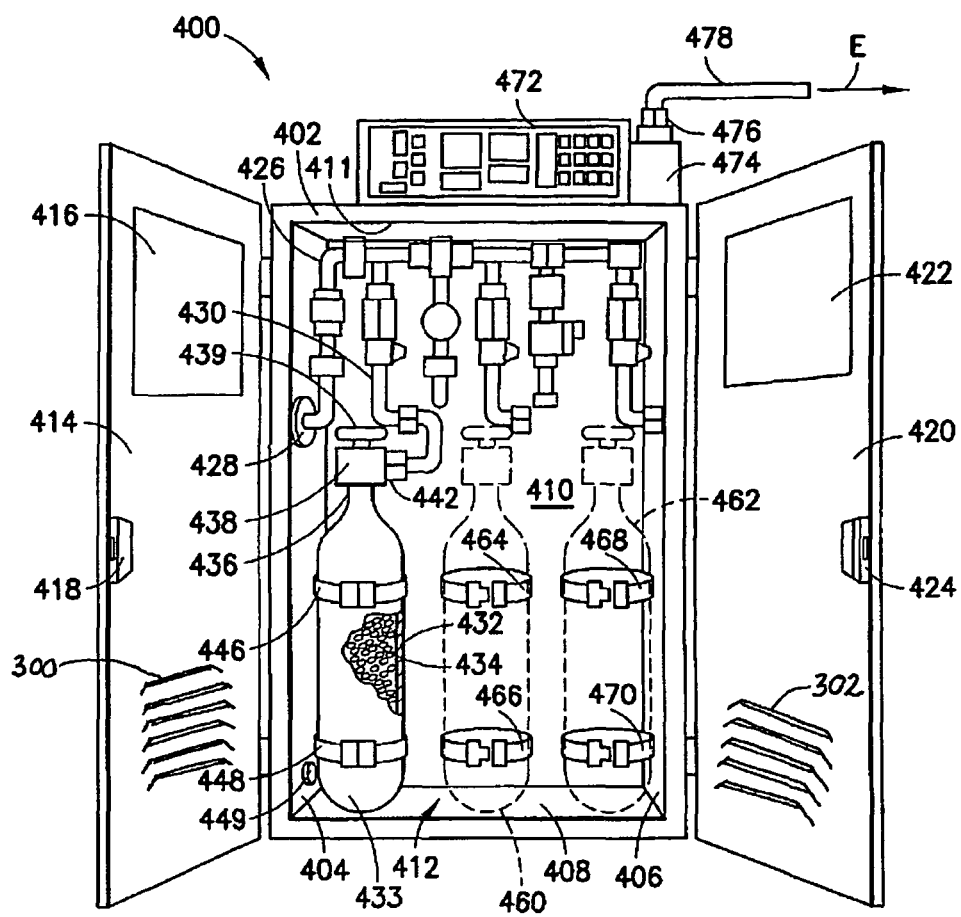
FIG. 3 is a schematic representation of a gas cabinet containing multiple sorbent-based fluid supply vessels, as adapted for passage of ventilation gas therethrough.

FIG. 3 is a schematic representation frontal perspective view of a gas cabinet 400 containing multiple sorbent-based fluid supply vessels, as adapted for passage of ventilation gas therethrough.

The gas cabinet assembly 400 includes a gas cabinet 402. The gas cabinet 402 has side walls 404 and 406, floor 408, rear wall 410 and ceiling 411 defining a housing with front doors 414 and 420. The housing and respective doors enclose an interior volume 412.

The doors may be arranged to be self-closing and self-latching in character. For such purpose, the door 414 may have a latch element 418 that cooperatively engages lock element 424 on door 420. The doors 414 and 420 may be beveled and/or gasketed in such manner as to produce a gas-tight seal upon closure of the doors.

The doors 414 and 420 as shown may be equipped with windows 416 and 422, respectively. The windows may by wire-reinforced and/or tempered glass, so as to be resistant to breakage, while at the same time being of sufficient area to afford an unobstructed view of the interior volume 412 and manifold 426.

The manifold 426 as shown may be arranged with an inlet connection line 430 that is joinable in closed flow communication with gas supply vessel 433.

The manifold 426 may comprise any suitable components, including for example flow control valves, mass flow controllers, process gas monitoring instrumentation for monitoring the process conditions of the gas being dispensed from the supply vessel, such as pressure, temperature, flow rate, concentration, and the like, manifold controls, including automated switching assemblies for switchover of the gas supply vessels when a multiplicity of such vessels is installed in the gas cabinet, leak detection devices, automated purge equipment and associated actuators for purging the interior volume of the gas cabinet when a leak is detected from one or more of the supply vessels.

The manifold 426 connects to an outlet 428 at the wall 404 of the cabinet, and the outlet 428 may in turn be connected to piping for conveying the gas dispensed from the supply vessel to a downstream gas-consumption unit coupled with the gas cabinet. The gas-consumption unit may for example comprise an ion implanter, chemical vapor deposition reactor, photolithography track, diffusion chamber, plasma generator, oxidation chamber, etc. The manifold 426 may be constructed and arranged for providing a predetermined flow rate of the dispensed gas from the supply vessel and gas cabinet to the gas-consumption unit.

The gas cabinet has a roof-mounted display 472 coupled with the manifold elements and ancillary elements in the interior volume of the cabinet, for monitoring the process of dispensing the gas from the gas supply vessel(s) in the interior volume of the cabinet.

The gas cabinet 402 is adapted for passage of ventilation gas therethrough by the ventilation gas inlet port 449 in the sidewall of the cabinet, by which a feed line for introduction of ventilation gas to the cabinet is able to be coupled to the cabinet. In such manner, ventilation gas is introduced to the interior volume of the gas cabinet to flow through such interior volume to the roof-mounted exhaust fan 474 for discharge from the cabinet.

In this arrangement, a roof-mounted exhaust fan 474 is coupled by coupling fitting 476 to discharge conduit 478 for discharge of gas from the interior volume of the cabinet, in the direction indicated by arrow E. The exhaust fan 474 may be operated at appropriate rotational speed to impose a predetermined vacuum or negative pressure in the interior volume of the cabinet, as a further protective measure against any undesirable efflux of gas leakage from the gas cabinet. The discharge conduit may therefore be coupled to a downstream gas treatment unit (not shown), such as a scrubber or extraction unit for removing any leakage gas from the exhaust stream.

In order to provide a supply of inflowing air for such purpose, the cabinet, e.g., the doors, may be constructed to allow a net inflow of ambient air as a sweep or purge stream for clearing the interior volume gas from the cabinet. Thus, the doors may be louvered, or otherwise be constructed for ingress of ambient gas, e.g., with louvered openings 300 and 302 to enable air from the exterior ambient environment of the gas cabinet to flow into and through the interior volume of the gas cabinet.

The gas supply vessel 433 may suitably comprise a leak-tight gas container, such as for example a cylindrical container including a wall 432 enclosing an interior volume of the vessel. Disposed in the interior volume of the container is a particulate solid sorbent medium, e.g., a physical adsorbent material such as carbon, molecular sieve, silica, alumina, etc. The sorbent may be of a type that has a high sorptive affinity and capacity for the gas to be dispensed.

For applications such as semiconductor manufacturing, in which dispensed reagent gases are preferably of ultra-high purity, e.g., "7-9's" purity, more preferably "9-9's" purity, and even higher, the sorbent material must be substantially free, and preferably essentially completely free, of any contaminant species that would cause decomposition of the stored gas in the vessel and cause the vessel interior pressure to rise to levels significantly above the desired set point storage pressure.

For example, it is typically desirable to utilize the sorbent-based storage and dispensing vessel to retain gas in the stored state at pressure not exceeding about atmospheric pressure, e.g., in the range of from about 25 to about 800 torr. Such atmospheric or below atmospheric pressure levels provide a high level of safety and reliability.

For such high purity gas dispensing operation from the sorbent-based storage and dispensing vessel(s), it is desirable that each such supply vessel be subjected to suitable preparative operations, such as vessel bake-out, and/or purging, to ensure that the vessel itself is free of contaminants that may outgas or otherwise adversely affect the gas dispensing operation in subsequent use of the sorbent-based storage and dispensing system. Further, the sorbent itself may be subjected to appropriate preparative operations, such as pretreatment to ensure desorption of all extraneous species from the adsorbent material, prior to being loaded in the supply vessel, or alternatively of being subjected to bake-out and/or purging after the adsorbent is charged to the vessel.

As shown in FIG. 3, the supply vessel 433 is of elongate vertically upstanding form, having a lower end that is reposed on the floor 408 of the cabinet, and with an upper neck portion 436 to which is secured a valve head 438 to leak-tightly seal the vessel. In its fabrication, the supply vessel 433 may be filled with adsorbent and thereafter, before or after the sorbate gas is loaded on the sorbent, the valve head 438 may be secured to the vessel neck portion, e.g., by welding, brazing, soldering, compressive joint fixturing with a suitable sealant material, etc., so that the vessel thereafter is leak-tight in character at the neck joint with the valve head.

The valve head 438 is provided with a coupling 442 for joining the vessel to suitable piping or other flow means permitting selective dispensing of gas from the vessel. The valve head may be provided with a hand wheel 439 for manually opening or closing the valve in the valve head, to flow or terminate the flow of gas into the connecting piping. Alternatively, the valve head may be provided with an automatic valve actuator that is linked to suitable flow control means, whereby the flow of gas during the dispensing operation is maintained at a desired level.

In operation, a pressure differential between the interior volume of the supply vessel 433 and the exterior piping/flow circuitry of the manifold is established to cause gas to desorb from the sorbent material and to flow from the vessel into the gas flow manifold 426. A concentration driving force for mass transfer is thereby created, by which gas desorbs from the sorbent and passes into the free gas volume of the vessel, to flow out of the vessel while the valve in the valve head is open.

Alternatively, the gas to be dispensed may be at least partially thermally desorbed from the sorbent in the vessel 433. For such purpose, the floor 408 of the cabinet may have an electrically actuatable resistance heating region on which the vessel is reposed, so that electrical actuation of the resistance heating region of the floor causes heat to be transferred to the vessel and the sorbent material therein. As a result of such heating, the stored gas desorbs from the sorbent in the vessel and may be subsequently dispensed.

The vessel may alternatively be heated for such purpose by deployment of a heating jacket or a heating blanket that enwraps or surrounds the vessel casing, so that the vessel and its contents are appropriately heated to effect the desorption of the stored gas, and subsequent dispensing thereof.

As a further approach, desorption of the stored gas in the vessel may be carried out under the impetus of both pressure-differential-mediated desorption and thermally-mediated desorption.

As yet another alternative, the supply vessel may be provided with a carrier gas inlet port (not shown), which may be connected to a source of carrier gas (not shown) either interior or exterior to the cabinet. Such gas source may provide a flow of suitable gas, e.g., an inert gas or other gas that is non-deleterious to the process in the downstream gas-consumption unit. In such manner, gas may be flowed through the vessel to cause a concentration gradient to be developed that will effect desorption of the sorbate gas from the sorbent in the vessel. The carrier gas may therefore be a gas such as nitrogen, argon, krypton, xenon, helium, etc.

As shown in FIG. 3, the supply vessel 433 is held in place in the gas cabinet by strap fasteners 446 and 448 of a conventional type. Other fasteners could be used, such as neck rings, or other securement structures may be employed, such as receiving depressions or cavities in the floor of the gas cabinet, that matably receive the lower end of the vessel therein, guide members or compartment structures that fixedly retain the vessel in a desired position in the interior volume of the gas cabinet.

Although only one vessel 433 is shown in the gas cabinet in FIG. 3, such gas cabinet is shown as being constructed and arranged to retain one, two or three vessels therein. In addition to the vessel 433, an optional second vessel 460 and an optional third vessel 462 are shown in dashed line representation in FIG. 3, being associated with the respective strap fasteners 464 and 466 (for optional vessel 460) and strap fasteners 468 and 470 (for optional vessel 462).

It will be apparent that the gas cabinet may be widely varied, to contain one or more than one vessel therein. In such manner, any number of gas supply vessels can be retained in a single unitary enclosure, thereby providing enhanced safety and process reliability in relation to use of conventional high pressure compressed gas cylinders.

In such manner, a multiplicity of sorbent-containing gas supply vessels may be provided, for sourcing of the various gas components needed in the downstream gas-consumption unit, or to provide multiple vessels each containing the same gas. The gases in multiple vessels in the gas cabinet may thus be the same as or different from one another, and the respective vessels may be concurrently operated to extract gas therefrom for the downstream gas-consumption unit, or the respective vessels may be operated by a cycle timer program and automated valve/manifold operation means, to successively open the vessels in turn to provide continuity of operation, or otherwise to accommodate the process requirements of the downstream gas-consumption unit.

The display 472 may be programmatically arranged with associated computer/microprocessor means to provide visual output indicative of the status of process operation, the volume of the dispensed gas flowed downstream, the remaining time or gas volume for the dispensing operation, etc. The display may be arranged to provide output indicating the time or frequency of maintenance events for the cabinet, or any other suitable information appropriate to the operation, use and maintenance of the gas cabinet assembly.

The display may also comprise audible alarm output means, signalling the need for changeout of the vessels in the gas cabinet, a leakage event, approach of cycle termination, or any event, state or process condition that is useful in the operation, use and maintenance of the gas cabinet.

It will therefore be appreciated that the gas cabinet assembly of the present invention may be widely varied in form and function, to provide a flexible means for sourcing reagent gas(es) to a downstream gas-consumption unit, such as a process unit in a semiconductor manufacturing facility.

The gas cabinet arrangement shown in FIG. 3 has utility in the manufacture of semiconductor materials and devices, and in other gas-consuming process operations, where it provides a reliable "on demand" source of gas, e.g., hydride gases, halide gases, and gaseous organometallic Group V compounds, including, for example, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

By providing an economical and reliable source of such gases, in which the gas is safely held at relatively low pressure in the adsorbed state on a sorbent medium, and subsequently is easily dispensed to the point of use of the gas, the FIG. 3 arrangement avoids the hazards and gas handling problems associated with the use of conventional high pressure gas cylinders.

In the FIG. 3 apparatus, ventilation gas flow through the gas cabinet is modulated in correspondence to the inventory of fluid in the fluid supply vessels, so that the ventilation gas flow rate is reduced progressively as the inventory of fluid in the fluid supply vessel is progressively decreased until the vessel reaches an end of the dispensing process.

Figure 4:
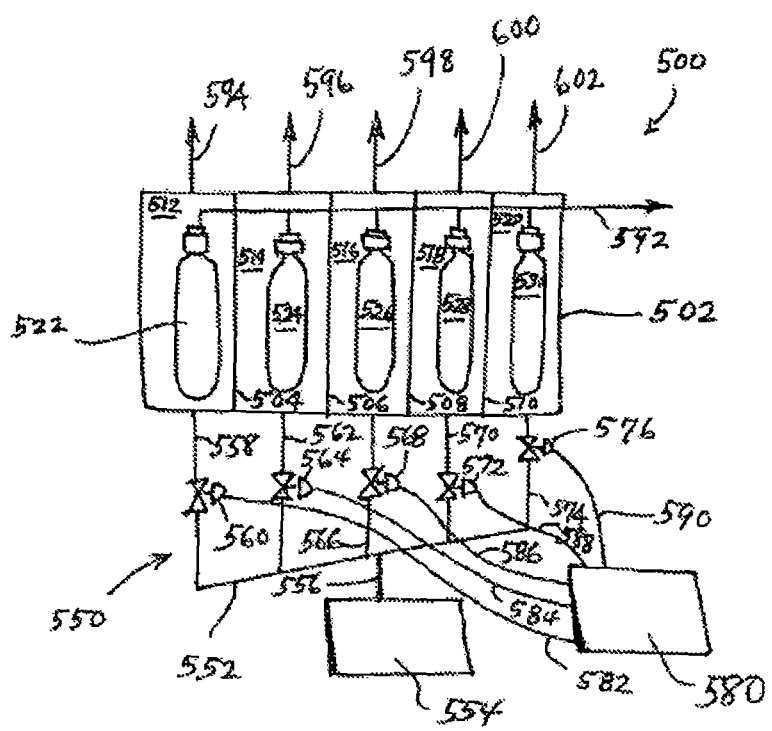
FIG. 4 is a schematic representation of a fluid supply system including a gas cabinet containing multiple sorbent-based fluid supply vessels, in which the gas cabinet is partitioned to provide a sub-enclosure for each fluid supply vessel therein.

FIG. 4 is a schematic representation of a fluid supply system 500 including a gas cabinet 502 containing multiple sorbent-based fluid supply vessels 522, 524, 526, 528 and 530, in which the gas cabinet is partitioned by partition walls 504, 506, 508 and 510 to provide a sub-enclosure 512, 514, 516, 518 and 520 for each fluid supply vessel therein. The partitions are individually vented by vent lines 594, 596, 598, 600, and 602. Gas is dispensed from the vessels in the sub-enclosures and may be dispensed to manifold line 592 coupled to each of the vessels in the respective sub-enclosures, so that as each fluid supply vessel in turn becomes depleted, it is closed to flow communication with the manifold, by appropriate closure of the valve in a valve head assembly of such vessel, and the next succeeding vessel is opened to flow communication with the manifold line 592, and so on.

Alternatively, if the respective vessels contain different fluids, then each may have a separate dispensing line, in place of the common manifold line 592 shown in the drawing.

Ventilation of the respective sub-enclosures 512, 514, 516, 518 and 520 is carried out with the provision of a source 554 of a ventilation gas, such as clean dry air (CDA), argon, helium, nitrogen, etc. the ventilation gas source 554 is coupled by ventilation gas feedline 556 to penalizing gas manifold 552, which is joined to branch lines 558, 562, 566, 570 and 574 having flow control valves 560, 564, 568, 572 and 576 therein, respectively. Each of the branch lines 550 8, 562, 566, 570 and 574 is joined in flow communication with a corresponding one of the respective sub-enclosures 512, 514, 516, 518 and 520.

The flow control valves 560, 564, 568, 572 and 576 can be selectively modulated as desired, by the controller 580, which is joined to each of such flow control valves in turn, by signal transmission lines 582, 584, 586, 588 and 590, respectively. Although not illustrated, the controller 580 is suitably connected to sensing components for monitoring fluid inventory, dispensed fluid pressure, weight of the fluid supply vessel (thereby indirectly monitoring the fluid inventory), heat of desorption (incident to desorption of gas from the physical adsorbent in the fluid supply vessels during dispensing operation), temperature in the sub-enclosures, cumulative volume of dispensed fluid, or any other operating condition, equipment setting, time lapse, process parameter, or other variable providing a basis for modulating the ventilation gas flow in specific sub-enclosure(s) of the enclosure 502.

In general, the modulation of ventilation gas flow in correspondence to the hazard level or predetermined risk associated with the fluid in the fluid supply vessels can be based on any suitable relationship, ratios, parameters or correlations. Although the disclosure herein has been primarily directed to description of embodiments in which the pressure or inventory of fluid in or from the fluid supply vessel provides a basis for such modulation, it will be recognized that the hazard level or predetermined risk associated with the fluid in the fluid supply vessel can be quantitated or utilized in any suitable manner, in specific applications.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A ventilation gas management system for an enclosure containing a fluid supply vessel and flow circuitry coupled thereto and adapted for flow of ventilation gas through the enclosure, said system comprising:
   a flow modulator arranged to control ventilation gas flow through the enclosure;
   a monitoring assembly adapted to (i) monitor a characteristic of said fluid supply vessel, enclosure, or fluid in or dispensed from said fluid supply vessel, that affects a level of hazard or risk associated with leakage of fluid from said fluid supply vessel or associated flow circuitry in said enclosure, and (ii) output a monitoring signal correlative of the monitored characteristic; and
   a controller arranged to receive said monitoring signal from said monitoring assembly, and to responsively adjust the flow modulator based on fluid inventory in the fluid supply vessel during dispensing of fluid therefrom, in relation to the level of hazard or risk associated with leakage of fluid from said fluid supply vessel in said enclosure.

2. The system of claim 1, wherein the monitored characteristic comprises at least one characteristic selected from the group consisting of: fluid inventory in the fluid supply vessel; fluid pressure in the fluid supply vessel; fluid pressure in a gas delivery manifold downstream of the fluid supply vessel; strain in a wall of the fluid supply vessel; weight of the fluid supply vessel containing said fluid; physical adsorbent characteristic of a physical adsorbent disposed in an interior volume of the fluid supply vessel; temperature of the fluid supply vessel; temperature in the enclosure; cumulative volume of fluid dispensed from said fluid supply vessel; duration of fluid dispensing from said fluid supply vessel; flow rate of fluid dispensed from said fluid supply vessel; ambient conditions in said enclosure; fluid conditions in said fluid supply vessel; open or closed character of an access structure of the enclosure; and an alarm condition associated with the fluid supply vessel, flow circuitry, enclosure and/or process consuming the dispensed fluid.

3. The system of claim 1, wherein the controller is arranged to responsively adjust the flow modulator to reduce flow of ventilation gas through the enclosure during dispensing of fluid from the fluid supply vessel, so that ventilation gas flow through the enclosure is progressively reduced as fluid inventory decreases during said dispensing of fluid.

4. The ventilation gas management system of claim 1, as adapted for management of ventilation gas flow wherein the enclosure is compartmented to provide a separate sub-enclosure for each of multiple fluid supply vessels, and wherein the ventilation gas management system is arranged to manage ventilation gas flow through each sub-enclosure.

5. The system of claim 1, as operably deployed with a gas box of an ion implanter in a semiconductor manufacturing facility, to modulate flow of ventilation gas through the gas box.

6. The system of claim 5, wherein the gas box contains a sorbent-based fluid supply vessel.

7. The system of claim 6, wherein the sorbent-based fluid supply vessel contains fluid selected from the group consisting of hydride gases, halide gases, gaseous organometallic compounds, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

8. The system of claim 6, wherein fluid is stored in said fluid supply vessel at sub-atmospheric pressure.

9. The system of claim 5, wherein the gas box contains an internally pressure-regulated fluid supply vessel.

10. The system of claim 9, wherein the internally pressure-regulated fluid supply vessel contains fluid selected from the group consisting of hydride gases, halide gases, gaseous organometallic compounds, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

11. A method of supplying gas from a fluid source in an enclosure through which ventilation gas is flowed, said method comprising monitoring a characteristic of said fluid source, enclosure, or fluid in or dispensed from said fluid source, that affects a level of hazard or risk associated with leakage of fluid from said fluid source or associated flow circuitry in said enclosure, and in response to said monitoring, adjusting flow of ventilation gas through the enclosure based on fluid inventory in the fluid source during dispensing of fluid therefrom, in relation to the level of hazard or risk associated with leakage of fluid from said fluid source in said enclosure.

12. The method of claim 11, wherein the monitored characteristic comprises at least one characteristic selected from the group consisting of: fluid inventory in the fluid source; fluid pressure in the fluid source; fluid pressure in a gas delivery manifold downstream of the fluid supply vessel; strain in a wall of the fluid source; weight of the fluid source containing said fluid; physical adsorbent characteristic of a physical adsorbent disposed in an interior volume of the fluid source; temperature of the fluid source; temperature in the enclosure; cumulative volume of fluid dispensed from said fluid source; duration of fluid dispensing from said fluid source; flow rate of fluid dispensed from said fluid source; ambient conditions in said enclosure; fluid conditions in said fluid source; open or closed character of an access structure of the enclosure; and an alarm condition associated with the fluid source, flow circuitry, and/or enclosure.

13. The method of claim 11, wherein the monitored characteristic comprises pressure fluid dispensed from said fluid source.

14. The method of claim 11, wherein said adjusting comprises modulating a flow control device selected from the group consisting of: flow control valves; dampers; variable-size restricted flow orifice devices; mass flow controllers; variable speed pumps; and variable speed blowers.

15. The method of claim 11, wherein said adjusting comprises acquiring data in a data acquisition module that is positioned outside the enclosure and is operatively coupled with at least one sensor in the enclosure for said monitoring.

16. The method of claim 11, wherein said adjusting reduces flow of ventilation gas through the enclosure upon dispensing of fluid from the fluid source under non-alarm conditions and closed character of an access structure of the enclosure, and increases flow of ventilation gas through the enclosure upon occurrence of an alarm condition associated with the fluid supply vessel, flow circuitry, enclosure and/or process consuming the dispensed fluid, or upon the opening of the access structure of the enclosure.

17. The method of claim 11, wherein said adjusting reduces flow of ventilation gas through the enclosure during dispensing of fluid from the fluid source, so that ventilation gas flow through the enclosure is progressively reduced as fluid inventory decreases during said dispensing of fluid.

18. The method of claim 11, wherein the enclosure is compartmented to provide a separate sub-enclosure for each of multiple fluid sources, said method comprising carrying out said monitoring and adjusting flow of ventilation gas for each sub-enclosure.

19. The method of claim 11, as conducted in a semiconductor manufacturing facility comprising a gas box of an ion implanter as said enclosure, to modulate flow of ventilation gas through the gas box.

20. The method of claim 19, wherein the gas box contains a sorbent-based fluid supply vessel as said fluid source.

21. The method of claim 20, wherein the sorbent-based fluid supply vessel contains an activated carbon adsorbent.

22. The method of claim 20, wherein the sorbent-based fluid supply vessel contains fluid selected from the group consisting of hydride gases, halide gases, gaseous organometallic compounds, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

23. The method of claim 20, wherein fluid is stored in said fluid supply vessel at sub-atmospheric pressure.

24. The method of claim 19, wherein the gas box contains an internally pressure-regulated fluid supply vessel.

25. The method of claim 24, wherein the internally pressure-regulated fluid supply vessel contains fluid selected from the group consisting of hydride gases, halide gases, gaseous organometallic compounds, silane, diborane, germane, ammonia, phosphine, arsine, stibine, hydrogen sulfide, hydrogen selenide, hydrogen telluride, boron trifluoride, $B_2F_4$, tungsten hexafluoride, chlorine, hydrogen chloride, hydrogen bromide, hydrogen iodide, and hydrogen fluoride.

* * * * *